US009595200B2

(12) United States Patent
Krogh et al.

(10) Patent No.: US 9,595,200 B2
(45) Date of Patent: Mar. 14, 2017

(54) SYSTEM AND METHOD FOR PROVIDING GUIDANCE DURING A FLARE MANEUVER OF AN AIRCRAFT

(71) Applicant: The Boeing Company, Chicago, IL (US)

(72) Inventors: Steven B. Krogh, Issaquah, WA (US); Brian K. Rupnik, Seattle, WA (US)

(73) Assignee: The Boeing Company, Chicago, IL (US)

(*) Notice: Subject to any disclaimer, the term of this patent is extended or adjusted under 35 U.S.C. 154(b) by 323 days.

(21) Appl. No.: 14/617,567

(22) Filed: Feb. 9, 2015

(65) Prior Publication Data

US 2016/0231137 A1 Aug. 11, 2016

(51) Int. Cl.
*G05D 1/08* (2006.01)
*G08G 5/00* (2006.01)

(52) U.S. Cl.
CPC ......... *G08G 5/0047* (2013.01); *G05D 1/0808* (2013.01)

(58) Field of Classification Search
CPC ..... G05D 1/0808; G01C 23/00; G08G 5/0047
USPC .................................... 701/18; 244/183, 187
See application file for complete search history.

(56) References Cited

U.S. PATENT DOCUMENTS 3,031,662 A 4/1962 Bond
3,333,795 A 8/1967 Hattendorf et al.
3,489,378 A 1/1970 Watson et al.
3,604,908 A 9/1971 Loome et al.
3,892,373 A 7/1975 Doniger
4,354,237 A 10/1982 Lambregts et al.
4,413,320 A * 11/1983 Brandau .............. G05D 1/0676 244/183
5,111,403 A * 5/1992 Orgun .................. G05D 1/0676 244/183
5,695,156 A 12/1997 Firuz et al.
8,527,118 B2 9/2013 Jones et al.
8,831,799 B1 9/2014 Levine et al.

OTHER PUBLICATIONS

Maslowski, Longitudinal Motion Control for Flare Phase of Landing, 2011, Transactions of the Institute of Aviavtion, 217.*

* cited by examiner

*Primary Examiner* — Mussa A Shaawat
*Assistant Examiner* — Nadeem Odeh
(74) *Attorney, Agent, or Firm* — Walters & Wasylyna LLC

(57) ABSTRACT

A system and method for providing guidance during a flare maneuver of an aircraft may include the steps of: (1) generating a primary flare command from a primary flare control law based on an altitude of the aircraft, (2) generating the secondary flare command from a secondary flare control law based on inertial vertical speed of the aircraft, and (3) generating an ultimate flare command by selecting one of the primary flare command when the aircraft is over regular terrain or the secondary flare command when the aircraft is over irregular terrain.

20 Claims, 5 Drawing Sheets

200
128
θ
130
220
132
110
114
100
118
116
112
122
106
126
124
108
120
102
104

100
102
104
106
108
110
112
114
116
118
120
122
124
126
128
130
132
θ
200
220

SYSTEM AND METHOD FOR PROVIDING GUIDANCE DURING A FLARE MANEUVER OF AN AIRCRAFT

FIELD

The present disclosure is generally related to flight control systems for aircraft and, more particularly, to systems and methods for providing guidance during a flare maneuver of an aircraft over variations in terrain.

BACKGROUND

Fixed-wing aircraft landing is accomplished by reducing the airspeed and the rate of decent (e.g., sink rate) such that the aircraft descends at a suitably low rate to allow for a gentle touchdown. Reduction of airspeed and rate of decent are accomplished by reducing thrust and/or inducing a greater amount of drag on the aircraft (e.g., by using flaps, landing gear, speed breaks or the like). When a fixed-wing aircraft approaches the ground, the aircraft executes a flare or roundout (commonly known as flaring or a flaring maneuver). Flaring is a smooth transition from a normal approach attitude to a landing attitude by increasing the angle of attack of the aircraft (e.g., the aircraft pitches upward). When the angle of attack is increased, lift is momentarily increased, thereby decreasing the rate of descent of the aircraft, allowing the aircraft to settle to an acceptable speed and touchdown on its landing gear.

Automatic landing systems are widely used to provide reliable and safe automatic or semi-automatic landings, particularly in low visibility conditions (e.g., landings in fog, in rain or at night or other landings under adverse weather conditions). In order to automatically land the aircraft, the aircraft must be accurately controlled to provide a smooth landing flare path as the aircraft approaches ground level.

In many instances, the terrain at ground level prior to a landing zone (e.g., a runway) is not always flat. Instead, the ground prior to a landing threshold (e.g., denoting the beginning and end of the designated space for landing) may have irregular topography. Thus, the majority of automatic landing systems utilize radio altitude (e.g., a measure of the height of the aircraft above ground level) to respond to topographical changes in terrain height as the aircraft passes over them. However, reliance on radio altitude can cause improper flare maneuvers due to undesirable pitch activity of the aircraft. Such undesirable pitch activity may often results in a touchdown at an inappropriate distance from the landing threshold (e.g., too far down the runway) or an inappropriately high sink rate of the aircraft. Undesirable pitch activity may further result in non-use or disconnection of the automatic landing system and/or abortion of the landing.

Accordingly, those skilled in the art continue with research and development efforts in the field of automatic landing systems for aircraft.

SUMMARY

In one embodiment, the disclosed method for providing guidance during a flare maneuver of an aircraft may include the steps of: (1) generating a primary flare command from a primary flare control law based on an altitude of the aircraft, (2) generating the secondary flare command from a secondary flare control law based on inertial vertical speed of the aircraft, and (3) generating an ultimate flare command by selecting one of the primary flare command when the aircraft is over regular terrain or the secondary flare command when the aircraft is over irregular terrain.

In another embodiment, the disclosed computer-readable storage medium including computer-executable instructions that, when executed by a computer, may cause the computer to: (1) generate a primary flare command from a primary flare control law based on an altitude, (2) generate a secondary flare command from a secondary flare control law based on inertial vertical speed, and (3) generate an ultimate flare command by selecting one of the primary flare command to account for regular terrain or the secondary flare command to account for irregular terrain.

In yet another embodiment, the disclosed system for providing guidance during a flare maneuver of an aircraft may include a processor, a memory communicatively coupled to the processor, and a program module that executes in the processor from the memory and that, when executed by the processor, causes the processor to: (1) generate a primary flare command from a primary flare control law based on an altitude, (2) generate a secondary flare command from a secondary flare control law based on inertial vertical speed, and (3) generate an ultimate flare command by selecting one of the primary flare command to account for regular terrain or the secondary flare command to account for irregular terrain.

In the various embodiments, the primary flare command may be generated from a primary flare control law based on an altitude of the aircraft, and, the secondary flare command may be generated from a secondary flare control law based on inertial vertical speed of the aircraft.

Other embodiments of the disclosed systems and method will become apparent from the following detailed description, the accompanying drawings and the appended claims.

DETAILED DESCRIPTION

Figure 1:
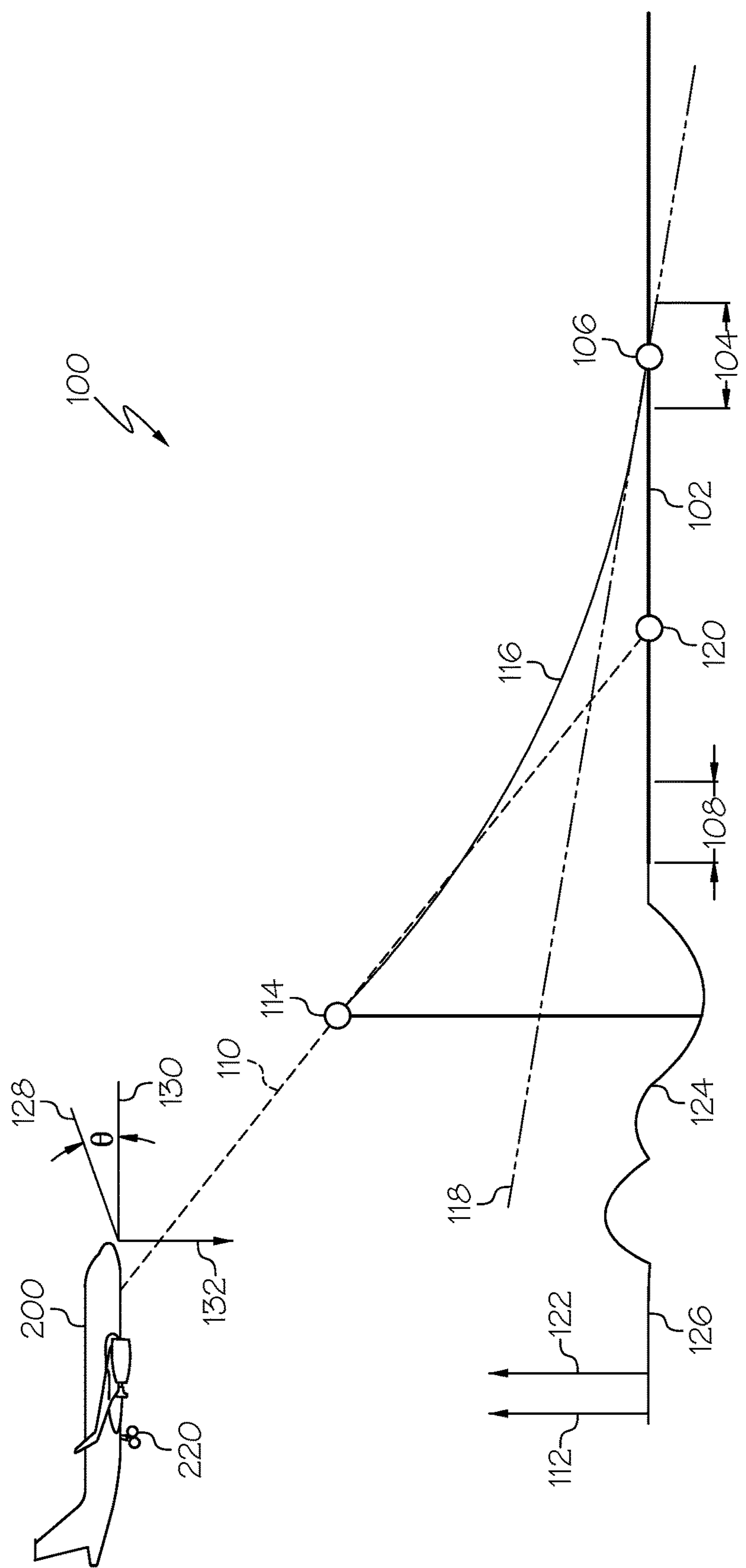
FIG. 1 is a schematic illustration of a landing diagram depicting a flare maneuver of an aircraft.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

The present disclosure recognizes and takes into account that most conventional aircraft have various autopilot and other avionics systems that are capable of autonomously flying an aircraft along a pre-determined or pre-programmed flight course, or capable of providing guidance and feedback to the pilot during flight in order to assist the pilot in maintaining the desired course.

The present disclosure further recognizes and takes into account that in a conventional approach to landing the aircraft, signals from the avionics systems (e.g., an instrument landing system) are received to manually (e.g., by pilot) or automatically (e.g., by autopilot) control the flight path of the aircraft. Control of the flight path of the aircraft requires a combination of pitch control and/or thrust control of the aircraft.

The present disclosure further recognizes and takes into account that conventional flare maneuver guidance systems may not adequately provide pilots or autopilots with a flare maneuver that is dependable and accurate according to irregular terrain characteristics prior to a landing zone (e.g., a runway) on which the associated aircraft is landing.

FIG. 1 is a schematic landing diagram 100, illustrating a side view of aircraft 200 landing on landing zone 102. Landing diagram 100 will be used herein to generally describe a landing operation and a corresponding flare maneuver. Embodiments of control system 224 and, particularly, flare guidance subsystem 300 (FIG. 2) that provides guidance throughout the landing operation, and specifically with respect to the flare maneuver, will be described in greater detail herein below.

Referring to FIG. 1, landing zone 102 may include touchdown zone 104 and landing zone threshold 108. Touchdown zone 104 may include touchdown location 106. Landing zone 102 may include a man-made surface (e.g., asphalt, concrete, or a mixture thereof), a natural surface (e.g., grass, dirt, gravel, water, snow, or ice) or any other suitable space designated for a landing operation. As one specific, non-limiting example, landing zone 102 may be a runway. Landing threshold 108 may include a portion of landing zone 102 that denotes the beginning of the designated space for landing (e.g., the beginning of the runway). Touchdown zone 104 may include a desired portion of landing zone 102 that is targeted by aircraft 200 as touchdown location 106. Touchdown location 106 may be a desired location within touchdown zone 104 where aircraft 200 (e.g., landing gear 220 of aircraft 200) first contacts the surface of landing zone 102.

Those skilled in the art will recognize that the size and location of touchdown zone 104 may vary according to any number and type of factors. Examples of these factors may include, but are not limited to, the length of landing zone 102; the weight, landing speed, and braking/thrust-reverse capabilities of aircraft 200; environmental conditions such as altitude, temperature, and weather; pilot preference; and any combination thereof.

In order to land within touchdown zone 104, aircraft 200 may fly along pre-flare flight path 110 to landing zone 102. At flare engage altitude 114 (e.g., height above the ground directly below), aircraft 200 may engage the flare mode and initiate the flare maneuver until landing at touchdown location 106. Those skilled in the art will recognize that flare engage altitude 114 may be reached prior to (e.g., some distance away from) landing zone threshold 108. For example, flare engage altitude 114 may be reached over terrain 124 of ground surface 126. As used herein, flare engage altitude 114 refers to the height or distance of aircraft 200 above ground surface 126 over which aircraft 200 is flying when the flare maneuver is initiated (e.g., absolute altitude).

Flare trajectory 116 of aircraft 200 may be a commanded path through space through which aircraft 200 will transition from a higher sink rate, or altitude rate, associated with pre-flare flight path 110 at flare engage altitude 114 to a lower sink rate appropriate for touchdown at touchdown location 106 within touchdown zone 104. As seen in landing diagram 100, flare trajectory 116 of aircraft 200 may be curvilinear, essentially leveling out the substantially downward trajectory of pre-flare flight path 110 to provide a gentle touchdown on landing zone 102 within touchdown zone 104.

Flare command path 118 may be a linear path through space that is defined as altitude 112 (e.g., height above the ground directly below) versus longitudinal distance (e.g., of landing zone 102). As used herein, altitude 112 refers to the height or distance of aircraft 200 above ground surface 126 over which aircraft 200 is flying (e.g., absolute altitude). The slope of flare command path 118 may be calculated to provide a desired sink rate (e.g., decent rate) at touchdown, given the ground speed of aircraft 200 at the engagement of the flare mode (which occurs at flare engage altitude 114).

Flare command path 118 may be constructed to intersect landing zone 102 within touchdown zone 104 for a given approach. As one example, flare command path 118 may be constructed using an extrapolated flight path-landing zone intersection 120, and the location of touchdown zone 104 with respect to that flight path-landing zone intersection 120. As another example, flare command path 118 may be constructed using the intersection of an approach path (not shown) with the ground, rather than the extrapolated flight path-landing zone intersection 120. Generally, the intersection of flare command path 118 with landing zone 102 may be some distance added to flight path-landing zone intersection 120, if no flare maneuver took place.

As illustrated in FIG. 1, altitude 112 (or gear altitude 122) at the end of flare command path 118 relative to the surface of landing zone 102 may be negative after the intersection of flare command path 118 with landing zone 102. This negative altitude indicates that the desired trajectory of aircraft 200 after touchdown location 106 may be below landing zone 102. The negative flare command path may ensure that control system 224 of aircraft 200 will continue to indicate that the aircraft 200 is to descend to complete the landing operation even if external disturbances (e.g., shearing winds) cause aircraft 200 to float past touchdown location 106.

During the landing operation, at some distance away from landing zone 102, aircraft 200 may deploy landing gear 220. In a conventional landing operation, landing gear 220 may be deployed prior to or during pre-flare flight path 110 before aircraft 200 reaches flare engage altitude 114 (e.g., early in the approach path or pre-flare flight path 110). Upon deployment of landing gear 220, gear altitude 122 may be calculated. As used herein, gear altitude 122 refers to a computed estimate of the height or distance of landing gear 220 (e.g., the main landing gear) above ground surface 126 over which aircraft 200 is flying. As one, non-limiting example, gear altitude 122 may be calculated based on altitude 112 and pitch 128 (e.g., the pitch attitude) of aircraft 200 (e.g., determined by one or more sensor resources 272) (FIG. 2) and known dimensions of aircraft 200.

Thus, in embodiments of the landing operation disclosed herein, flare engage altitude 114, flare command path 118 and/or flare trajectory 116 may be based on gear altitude 122 of aircraft 200.

In a conventional landing operation, aircraft 200 (e.g., as controlled by pilot and/or autopilot) may attempt to touchdown on landing zone 102 at a very low sink rate in order to provide a soft, comfortable landing. During a typical flare maneuver performed during the landing operation, aircraft 200 may pitch up so that aircraft 200 sinks to landing zone 102 at a reduced sink rate that first settles the main landing gear onto landing zone 102, followed by the nose gear as aircraft 200 slows. However, if pitch 128 of aircraft 200 is too high at or near touchdown, the tail of aircraft 200 may strike landing zone 102, which may cause damage and/or potential loss of control of aircraft 200. Similarly, if pitch 128 of the aircraft 200 is too low at or near touchdown, the nose gear of aircraft 200 may contact landing zone 102 prior to the main landing gear, which may damage the nose gear assembly. As illustrated in landing diagram 100 (FIG. 1) pitch 128 may be a measure of an angle Θ relative to (e.g., positive or negative) a local level vector 130, which is normal to a gravity vector 132.

Conventional aircraft control systems 224 utilize a flare control law, which generates a pitch control surface command signal that controls pitch 128 (or pitch rate) of aircraft 200 suitable for guiding aircraft 200 along flare trajectory 116 to touchdown location 106. However, a conventional flare control law primarily relies on the height of aircraft 200 above ground surface 126 (e.g., altitude 112 or gear altitude 122). Disadvantageously, reliance on the height of aircraft 200 above ground surface 126 may result in undesirable pitch 128 (or pitch rate) and/or other undesirable flare characteristics of aircraft 200 during the flare maneuver.

As one example, and as illustrated in FIG. 1, terrain 124 of ground surface 126 prior to landing zone 102 may include irregular topography (e.g., an upslope, a downslope, a step, a wall, a ditch or any other irregular surface profile of ground surface 126). Such irregular terrain 124 (e.g., at flare engage altitude 114 or at any longitudinal point throughout flare trajectory 116) may result in pitch 128 of aircraft 200 that is too high or too low, which may result in a touchdown of aircraft 200 at an inappropriate distance from touchdown zone 104, an inappropriately high sink rate of aircraft 200 and/or damage to aircraft 200. Further, unexpected or inappropriate pitch activity by aircraft 200 during the flare maneuver may induce the flight crew of aircraft 200 to manually disconnect or override the autopilot, which usually results in an aborted landing.

Figure 2:
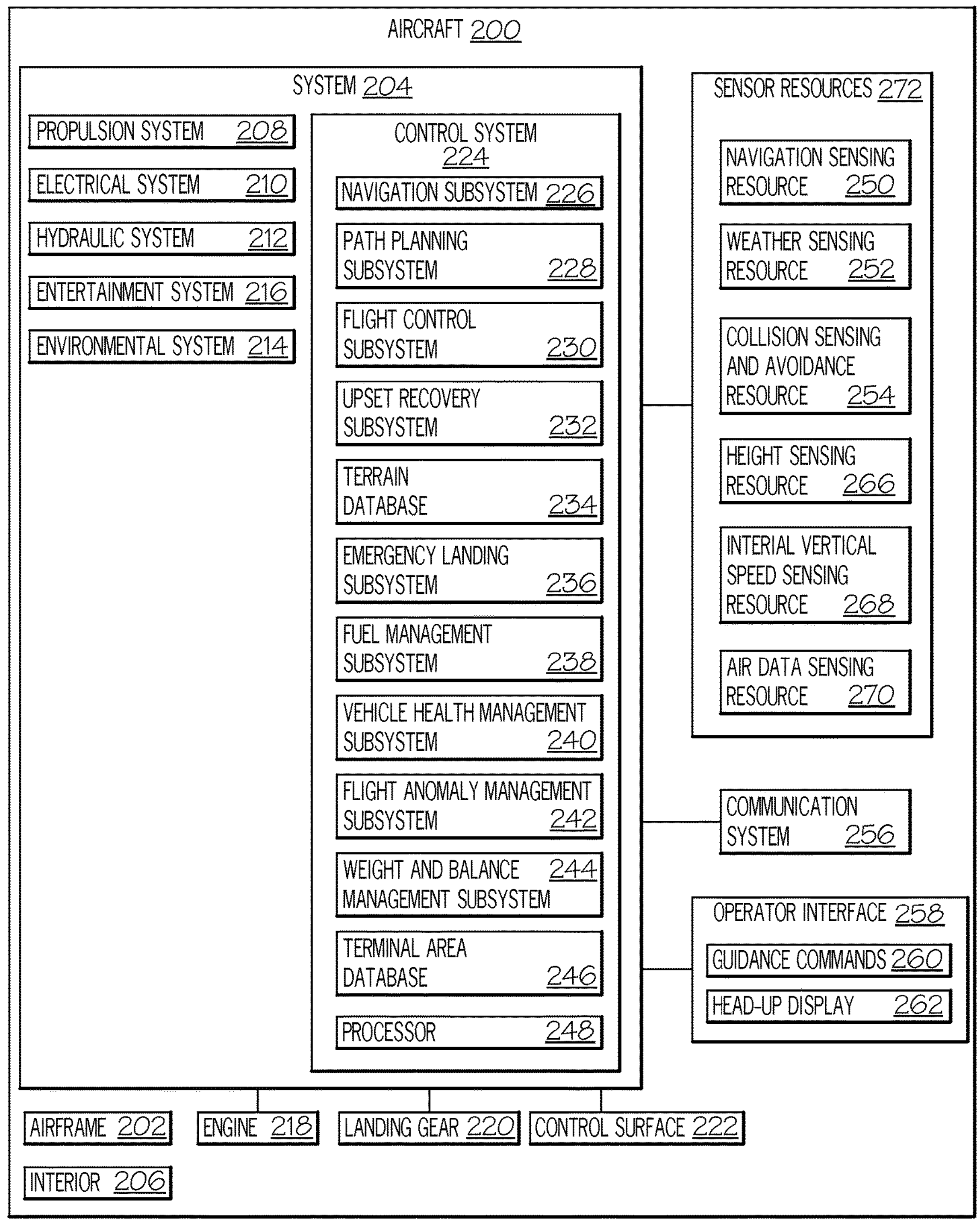
FIG. 2 is a block diagram of one embodiment of the aircraft of FIG. 1.

Referring to FIG. 2, one embodiment of aircraft 200 may include airframe 202 with a plurality of high-level systems 204 and interior 206. Examples of high-level systems 204 may include one or more of propulsion system 208, electrical system 210, hydraulic system 212, environmental system 214 and entertainment system 216. Any number of other systems may be included. Aircraft 200 may further include one or more engines 218, landing gear 220, and control surfaces 222 (e.g., ailerons, elevators, flaps, slats, etc.) Those skilled in the aeronautic arts will readily recognize the various embodiments of airframe 202, systems 204, engines 218, landing gear 220 and/or control surfaces 222, and further elaboration is not provided herein.

Aircraft 200 may further include control system 224. Control system 224 may include a plurality of subsystems and resources that are cooperatively configured to control (e.g., manually, automatically and/or semi-automatically) essentially all operational aspects of aircraft 200. As one example, control system 224 may be configured to fully automate various phases of travel (e.g., takeoff, flight and/or landing) of aircraft 200 such that little or no direct (e.g., "hands-on") operator input or control is required. As another example, control system 224 may be configured to semi-automate various phases of travel of aircraft 200 such as to provide flight guidance or other assistance to the operator (e.g., pilot). As yet another example, control system 224 may be configured to provide various outputs or commands to the operator during various phases of travel of aircraft 200.

Control system 224 may include navigation subsystem 226. Navigation subsystem 226 may be configured to perform all normal aspects of aircraft navigation, including, but not limited to, the use of global positioning signals, radio navigation beacons, celestial sensing, and/or other means for determining instantaneous location, and distance and direction to a multitude of known points.

Control system 224 may further include path planning (e.g., steering) subsystem 228. Path planning subsystem 228 may work in cooperation with navigation subsystem 226 to calculate and plot a flight path for aircraft 200 to a predetermined location (e.g., selected by pilot or autopilot).

Control system 224 may further include flight control subsystem 230 (e.g., autopilot or automated flight control subsystem). Flight control subsystem 230 may be configured to function in a ready, autonomous manner keeping track of numerous aspects of aircraft 200 operations. Flight control subsystem 230 may be further configured to implement fully automated or semi-automated control of aircraft 200 (or select subsystems thereof) in the event that such high-level automation is requested by the operator, for example, in low visibility conditions, or becomes necessary in an emergency response situation.

Control system 224 may further include flare guidance subsystem 300. Flare guidance subsystem 300 may be utilized (e.g., by pilot or autopilot) to control the flare maneuver of aircraft 200 near the completion of the landing operation and work in cooperation with navigation subsystem 226, flight control subsystem 230 and/or select other subsystems of control system 224. As examples, and with reference to FIG. 1, flare guidance subsystem 300 may provide guidance for maintaining the proper (e.g., predetermined) ground speed, sink rate, altitude 112 (or gear altitude 122), pitch 128 (e.g., pitch rate as a function of pitch attitude relative to the height above ground surface 126) and/or heading that will keep aircraft 200 on pre-flare flight path 110 and/or flare trajectory 116 to landing zone 102.

Control system 224 may further include various other subsystems including, but not limited to, upset recovery subsystem 232 configured to provide fast, automatic response and correction of abnormal or unanticipated conditions during flight of aircraft 200; terrain database 234 that includes detailed data regarding land surface features (e.g. mountains, tall building structures, lakes and seas, etc.) such that crash avoidance is automatically provided by way of cooperation with navigation subsystem 226 and/or other subsystems of control system 224; emergency landing subsystem 236 configured to perform full automated landing of aircraft 200 by way of cooperation with other subsystems of control system 224; fuel management subsystem 238 configured to monitor the fuel consumption during flight and the balance of fuel-related weight within aircraft 200; vehicle health management subsystem 240 configured to monitor numerous conditions about aircraft 200; flight anomaly management subsystem 242 configured to monitor numerous operational aspects of aircraft 200 and to calculate a contingency response in the event that an anomalous condition is detected; weight and balance management subsystem 244 configured to detect and analyze the overall weight of aircraft 200 and the distribution of that weight, prior to takeoff, during flight, and/or during landing; and/or terminal area database 246 that includes detailed data including, for example, respective airport terminal locations, aircraft number and size handling capacities, emergency response capabilities, surrounding area information, etc.

Control system 224 may further include one or more processors 248. Processor 248 may be configured to function in accordance with a computer-readable code provided to the control system 224 by way of computer-readable storage media. While not depicted in FIG. 2, those skilled in the computing and control arts will appreciate that such computer-readable storage media may include, but is not limited to, solid-state memory, optical storage media, magnetic storage media, etc. Other suitable forms of computer-readable storage media may also be used in accordance with the particular embodiment of control system 224. In any case, one or more of the subsystems of control system 224 may be implemented, at least in part, by executable program code provided to processors 248 by way of suitable computer-readable storage media.

Aircraft 200 may further one or more sensor resources 272. Sensor resources 272 may include navigation sensing resource 250 configured to detect, as non-limiting examples, global positioning signals, radio navigation signals, celestial objects, etc. and to communicate that sensed information to navigation subsystem 226.

Sensor resources 272 may further include weather sensing resource 252 configured to detect weather information by way of, for example, barometric pressure sensing, temperature sensing, Doppler radar, etc. and communicate that sensed information to navigation subsystem 226 and/or other subsystems of control system 224.

Sensor resources 272 may further include collision sensing and avoidance resource 254 configured to detect near-proximity aircraft, topographical features, and other collision hazards and communicate that information to flight anomaly management subsystem 242 and/or other subsystems of control system 224.

Sensor resources 272 may further include height sensing resource 266 configured to detect the height of aircraft 200 above ground surface 126 (e.g., altitude 112 and/or gear altitude 122) (FIG. 1) by way of, for example, a radio altimeter or similar device and communicate that sensed information to flight control subsystem 230, flare guidance subsystem 300 and/or other subsystems of control system 224.

Sensor resources 272 may further include inertial vertical speed ("IVS") sensing resource 268 configured to detect near instantaneous rates of descent or climb of aircraft 200 by way of, for example, a variometer and communicate that sensed information to flight control subsystem 230, flare guidance subsystem 300 and/or other subsystems of control system 224.

Sensor resources 272 may include air data sensing resource 270 configured to detect, as non-limiting examples, airspeed, altitude 112, altitude trend, etc. by way of, for example, a pitot-static system, a gyroscope, a GPS, an accelerometer, etc. and communicate that sensed information to navigation subsystem 226, flight control subsystem 230, flare guidance subsystem 300 and/or other subsystems of control system 224.

Aircraft 200 may further include communication system 256 that is in communication with, and at least partially controlled by, control system 224. Communication system 256 may be configured to perform bidirectional wireless communication between aircraft 200 and external entities. Such wireless signals may include, for example, satellite signals, shortwave radio signals, etc. Communication system 256 may include both digital data and voice communications modes.

Aircraft 200 may further include operator interface 258 in communication with control system 224. Operator interface 258 may include, as non-limiting examples, guidance commands 260 that include both visual and force feedback to a human operator (e.g., pilot) and/or heads-up display 262 that provides flight information electronically projected over the forward-looking cockpit view from aircraft 200.

FIG. 2 illustrates a number of components of aircraft 200. Those skilled in the art will appreciate that some of the components illustrated in FIG. 2 may be combined in various ways without the need to include other components described in FIG. 2, other drawing figures, and/or the accompanying disclosure, even though such combination or combinations are not explicitly illustrated herein. Similarly, additional components not limited to the examples presented, may be combined with some or all of the components shown and described herein.

Further, the illustrated embodiment of aircraft 200 in FIG. 2 is not meant to provide physical or architectural limitations to the manner in which different embodiments may be implemented. Other components in addition to and/or in place of the ones illustrated may be used. Some components may be unnecessary in some example embodiments. Also, some of the components may be presented to illustrate some functional components. One or more of these components may be combined and/or divided into different blocks when implemented in different embodiments.

Figure 3:
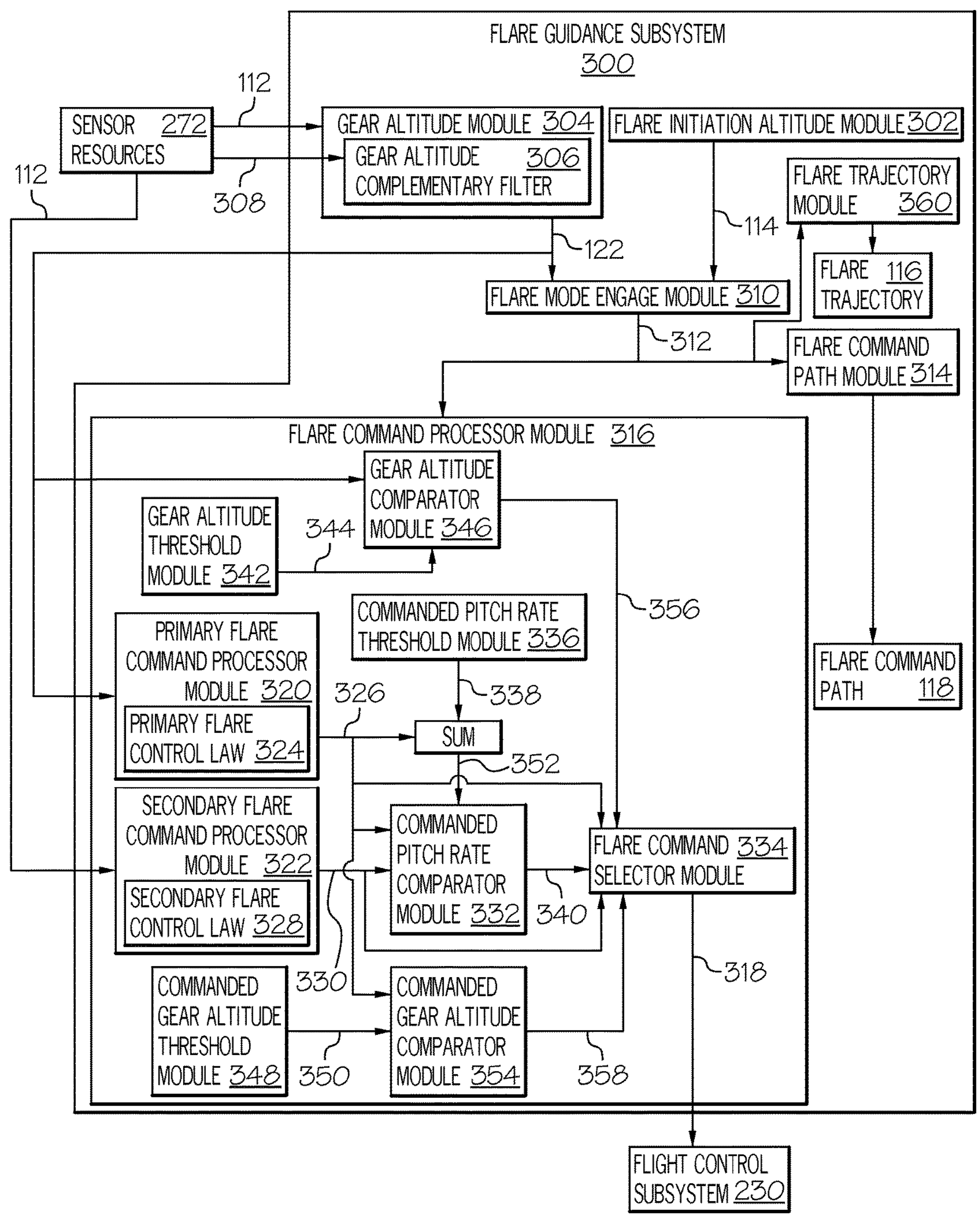
FIG. 3 is a block diagram of one embodiment of the disclosed flare guidance subsystem system for providing guidance during the flare maneuver illustrated in FIG. 1.

Referring to FIG. 3, one embodiment of the disclosed flare guidance subsystem 300 may utilize current flight parameters of the landing aircraft 200, coupled with characteristics of landing zone 102 upon which aircraft 200 is landing and/or terrain 124 of ground surface 126 prior to landing zone 102, to determine and provide appropriate flare maneuver guidance to flight control subsystem 230 and/or other subsystems of control system 224 during the landing operation and, particularly during the landing operation over irregular terrain 124 (FIG. 1). For example, flare guidance subsystem 300 may determine flare command path 118 and flare engage altitude 114, and guide aircraft 200 smoothly through the flare maneuver to direct aircraft 200 from pre-flare flight path 110 at flare engage altitude 114 to flare command path 118 along flare trajectory 116 to touchdown location 106.

FIG. 3 illustrates a number of components of flare guidance subsystem 300 and various outputs of the components. The components of flare guidance subsystem 300 will be described herein as "modules," which for the purpose of the present disclosure may include hardware, software or a combination thereof. By describing an illustrative flare guidance subsystem 300 in terms of the various modules, the determinations made by flare guidance subsystem 300 for providing pitch rate commands for guiding aircraft 200 through the flare maneuver may be better understood. As is described below, and with reference to FIG. 3, the outputs from some components may be used in various combinations as inputs to other components.

As inputs to flare guidance subsystem 300, sensor resources 272 may provide any type of current flight, environmental, or aircraft data as sensor output to flare guidance subsystem 300. As described above, sensor resources 272 may include any type and quantity of aircraft and environmental sensors installed on or within aircraft 200. Examples of sensor output may include, but are not limited to, altitude 112, temperature, pressure, airspeed, radio altitude, GPS altitude, pitch attitude, pitch rate, roll attitude, roll rate, yaw rate, descent rate, ground speed, and any other relevant data.

Referring to FIG. 1, prior to engagement of flare guidance subsystem 300, aircraft 200 may operate in an approach mode and follow the approach path (not shown) while flying an approach to landing zone 102. Aircraft 200 may follow or track a localizer or glideslope while flying along the approach path (e.g., pre-flare flight path 110). The approach path and, thus, the pre-flare pitch guidance of aircraft 200 along the approach path may be controlled, for example, by an instrument landing system (ILS) glideslope, a Global Navigation Satellite System (GNSS) landing system (GLS) glideslope, an integrated approach navigation (IAN) glidepath, vertical navigation (VNAV) or the like. At flare engage altitude 114, control system 224 transitions from the approach mode to a flare mode in which flare guidance subsystem 300 guides aircraft 200 through the flare maneuver in order to maintain aircraft 200 along flare trajectory 116 and perform a smooth touchdown in touchdown zone 104. Those skilled in the art will recognize that the particular type of aircraft guidance used prior to engagement of the flare mode (e.g., during the approach mode) in not a limiting factor of the present disclosure.

Referring to FIG. 3, and with reference to FIG. 1, flare guidance subsystem 300 may include flare initiation altitude module 302. Flare initiation altitude module 302 may determine flare engage altitude 114, which is the altitude at which the flare mode will engage. The flare mode may represent the mode of flare guidance subsystem 300 that provides flight guidance (e.g., to pilot or autopilot) in order to fly aircraft 200 along flare trajectory 116 to landing zone 102 (e.g., touchdown zone 104) for landing and provide any error correction during the flare maneuver. The flare mode may follow the approach guidance mode used to fly aircraft 200 from a cruise or other flight phase to flare engage altitude 114 (e.g., pre-flare flight path 110). Flare engage altitude 114 may vary according to a number of factors including, but are not limited to, flap setting, airspeed, descent rate, ambient temperature, field elevation, desired touchdown zone 104, length of landing zone 102, slope of landing zone 102, or any other characteristics that may affect the flare profile. As discussed herein above, flare engage altitude 114 may be defined in terms of altitude 112 and, more particularly, gear altitude 122.

Altitude 112 (e.g., radio altitude) may be determined by sensor resources 272, for example, by height sensing resource 266 (FIG. 2). Altitude 112 may be corrected for gear altitude 122. As one example, flare guidance subsystem 300 may further include gear altitude module 304 configured to correct for aircraft body altitudes or radio altitude antenna placement and compute gear altitude 122. Further, gear altitude module 304 may include gear altitude complementary filter 306. Gear altitude complementary filter 306 may be configured to subject gear altitude 122 (or altitude 112) to inertial smoothing based on inertial vertical speed 308 and/or other parameters determined by sensor resources 272, for example, by inertial vertical speed sensing resource 268 (FIG. 2).

Those skilled in the aeronautic arts will recognize that different embodiments of the systems and method described herein may use either altitude 112 or gear altitude 122. As one example, certain types of aircraft (e.g., a commercial aircraft, passenger aircraft, etc.) having traditional landing gear may utilize gear altitude 122. As another example, other types of aircraft (e.g., unmanned aerial vehicles) not having traditional landing gear may utilize altitude 112.

Flare guidance subsystem 300 may further include flare mode engage module 310. Flare mode engage module 310 may control the modes of operation of flare guidance subsystem 300. Flare mode engage module 310 may monitor flight parameters such as altitude 112 and/or gear altitude 122 of aircraft 200 and compare it to flare engage altitude 114. When the resulting gear altitude 122 (or altitude 112) is equal to or less than the calculated flare engage altitude 114, flare mode engage module 310 may provide flare mode engagement trigger 312 that initiates the activation of the flare mode. The flare mode engagement trigger 312 may include data or signals that trigger other components of flare guidance subsystem 300 to perform additional operations.

Flare guidance subsystem 300 may further include flare command path module 314. Upon receipt of flare mode engagement trigger 312, flare command path module 314 may determine flare command path 118. As described above, and with reference to FIG. 1, flare command path 118 may be a linear path in space having a slope corresponding to a desired descent rate at touchdown location 106, while intersecting landing zone 102 within touchdown zone 104. Various parameters may be used in the calculation of flare command path 118 including, but not limited to, the ground speed of aircraft 200 at flare engage altitude 114, the descent rate of aircraft 200 at flare engage altitude 114, the length of landing zone 102 and/or the distance of touchdown zone 104 from the extrapolated flight path-landing zone intersection 120. Flare command path 118 may be utilized by flare command processor module 316 to determine (e.g., generate) various flare commands and/or parameters (e.g., commanded pitch rate, commanded altitude, etc.) As examples, flare command path 118 may be utilized by primary flare control law 324 of primary flare command processor module 320 to generate primary flare command 326 and/or secondary flare command law 328 of secondary flare command processor module 322 to generate secondary flare command 330.

As one example, the ground speed and descent rate of aircraft 200 may be used to determine the location of flight path-landing zone intersection 120. An additional distance may be added to the location of flight path-landing zone intersection 120 to determine touchdown location 106. This additional distance may be a constant, or may be a factor of other variables depending on the desired implementation.

Flare guidance subsystem 300 may further include flare trajectory module 360. Upon receipt of flare mode engagement trigger 312, flare trajectory module 360 may determine flare trajectory 116. As described above, and with reference to FIG. 1, flare trajectory 116 may be a curvilinear path in space where aircraft 200 transitions from a higher sink rate to a lower sink rate for touchdown. Various parameters may be used in the calculation of flare trajectory 116. Flare trajectory 116 may be utilized by flare command processor module 316 to determine (e.g., generate) various flare commands and/or parameters (e.g., commanded pitch rate, commanded altitude, etc.)

Flare guidance subsystem 300 may further include flare command processor module 316. Flare command processor module 316 may be initialized upon activation of the flare mode (e.g., upon receipt of flare mode engagement trigger 312). Flare command processor module 316 may generate ultimate flare command 318. Ultimate flare command 318 may be utilized by flare guidance subsystem 300 to provide guidance (e.g., pitch rate guidance) during the flare maneuver of aircraft 200, for example, to flight control subsystem 230 and/or other subsystems of control system 224 during the landing operation.

Ultimate flare command 318 may provide guidance during the flare maneuver of aircraft 200 and provide a smooth transition from the position of aircraft 200 at flare engage altitude 114 to flare command path 118 at touchdown location 106. This transition is illustrated in FIG. 1 and described above as flare trajectory 116. When initialized, flare command processor module 316 may create commands that control, for example, pitch 128 (e.g., pitch rate and pitch altitude) that match the altitude and descent rate of aircraft 200 needed to perform the flare maneuver throughout flare trajectory 116. As one example, flight control subsystem 230 may utilize ultimate flare command 318 to control pitch 128 (e.g., pitch rate) of aircraft 200 throughout flare trajectory 116 to landing, for example, by controlling one or more control surfaces 222 (FIG. 2) of aircraft 200.

As described herein above, and with reference to FIG. 1, when aircraft 200 is flying over severely irregular terrain 124, a flare command based on the height of aircraft 200 above ground surface 126 (e.g., altitude 112 or gear altitude 122) may lead to unreasonable or distorted flare characteristics, for example, an undesirable pitch 128 (or pitch rate) of aircraft 200 throughout flare trajectory 116.

Referring to FIG. 3, and with reference to FIG. 1, flare guidance subsystem 300 may be configured to mitigate the effects of severely irregular terrain 124 of ground surface 126 on the flare characteristics of the flare maneuver prior to landing zone 102 (e.g., after reaching flare engage altitude 114 or at any longitudinal point along flare trajectory 116), while maintaining the precision control characteristics needed to meet stringent automated and/or semi-automated landing performance requirements. Flare command processor module 316 may generate an appropriate ultimate flare command 318 that includes suitable flare characteristics, for example, the appropriate pitch rate of aircraft 200 throughout flare trajectory 116 even when aircraft 200 is flying over severely irregular terrain 124. Flare command processor module 316 may include primary flare command processor module 320 and secondary flare command processor module 322.

Primary flare command processor module 320 may utilize primary flare control law 324 to generate primary flare command 326. Primary flare control law 324 may include an algorithm or other computational methods configured to utilize gear altitude 122 to generate primary flare command 326. Thus, primary flare control law 324 may be a conventional flare control law. Primary flare command 326 may include or create a pitch rate command (e.g., a pitch control surface command signal) that controls pitch 128 (or pitch rate) of aircraft 200 suitable for guiding aircraft 200 along flare trajectory 116 to touchdown location 106 over regular (e.g., substantially flat) terrain 124. Primary flare command 326 may also include or create a thrust command (e.g., to control the engines via an autothrottle or an engine control system) and/or a direct lift command (e.g., to symmetrically control the wing surfaces via the flight control system).

Secondary flare command processor module 322 may utilize secondary flare control law 328 to generate secondary flare command 330. Secondary flare control law 328 may include an algorithm or other computational methods configured to utilize inertial vertical speed 308 and/or other flight parameters to generate secondary flare command 330. Thus, secondary flare control law 328 may be an inertial flare control law. Accordingly, secondary flare control law 328 may be immune to irregularities in terrain 124 of ground surface 126 prior to landing zone 102. Secondary flare command 330 may include a pitch rate command (e.g., a pitch control surface command signal) that controls pitch 128 (or pitch rate) of aircraft 200 suitable for guiding aircraft 200 along flare trajectory 116 to touchdown location 106 over irregular terrain 124. Secondary flare command 330 may also include or create a thrust command (e.g., to control the engines via an autothrottle or an engine control system) and/or a direct lift command (e.g., to symmetrically control the wing surfaces via the flight control system).

Flare command processor module 316 may further include commanded pitch rate comparator module 332. Commanded pitch rate comparator module 332 may include suitable computational logic configured to compare a value of the pitch rate resulting from the pitch rate command of primary flare command 326 (also referred to herein as "primary commanded pitch rate") and a value of the pitch rate resulting from the pitch rate command of secondary flare command 330 (also referred to herein as "secondary commanded pitch rate"). When the pitch rate from secondary flare command 330 is greater than the pitch rate from primary flare command 326, commanded pitch rate comparator module 332 may generate selected flare command signal 340 indicating that secondary flare command 330 is available (and primary flare command 326 is unavailable) to flare command selector module 334 to be utilized as ultimate flare command 318. When the pitch rate from primary flare command 326 is greater than or equal to the pitch rate from secondary flare command 330, commanded pitch rate comparator module 332 may generate selected flare command signal 340 indicating that primary flare command 326 is available (and secondary flare command 330 is unavailable) to flare command selector module 334 to be utilized as ultimate flare command 318. In other words, commanded pitch rate comparator module 332 may determine which pitch rate command of primary flare command 326 or secondary flare command 330 results in a more positive (e.g., nose up) pitch 128 (FIG. 1), and selects that flare command as the indication of which of the primary flare control law 324 or the secondary flare control law 328 should be selected to generate ultimate flare command 318 (e.g., as indicated by selected flare command signal 340).

Primary flare command 326, secondary flare command 330 and selected flare command signal 340 may be provided to flare command selector module 334. Thus, in one embodiment of flare guidance subsystem 300, flare command selector module 334 may include suitable computational logic configured to utilize selected flare command signal 340 as a selection criteria for ultimate flare command 318. Flare command selector module 334 may utilize selected flare command signal 340 as the indication of which of primary flare command 326 or secondary flare command 330 to use (e.g., select) as ultimate flare command 318.

Flare guidance subsystem 300 may advantageously be configured to select primary flare command 326 when aircraft 200 is flying over regular terrain 124 or moderately irregular terrain 124 and select secondary flare command 330 only when aircraft 200 is flying over severely irregular terrain 124. When aircraft 200 is flying over regular terrain 124, the value of the pitch rate from primary flare command 326 generated using gear altitude 122 will typically be greater than or equal to the value of the pitch rate from secondary flare command 330 generated using inertial vertical speed 308. When aircraft 200 is flying over severely irregular terrain 124, the value of the pitch rate from secondary flare command 330 generated using inertial vertical speed 308 will often be greater than the value of the pitch rate from primary flare command 326 generated using gear altitude 122.

In order to ensure that flare command processor module 316 selects secondary flare command 330 only when aircraft 200 is flying over severely irregular terrain 124 and otherwise selects primary flare command 326 when aircraft 200 is flying over regular or moderately irregular terrain 124, flare command processor module 316 may include commanded pitch rate threshold module 336. Commanded pitch rate threshold module 336 may generate commanded pitch rate threshold 338. Commanded pitch rate threshold 338 may be a predetermined value added to the value of the pitch rate resulting from the pitch rate command of primary flare command 326.

Accordingly, commanded pitch rate comparator module 332 may compare the sum of the pitch rate from primary flare command 326 and commanded pitch rate threshold 338 (referred to herein as “adjusted primary pitch rate” 352) and the value of the pitch rate resulting from the pitch rate command of secondary flare command 330. When the pitch rate of secondary flare command 330 is greater than adjusted primary pitch rate 352, commanded pitch rate comparator module 332 may generate selected flare command signal 340 indicating that secondary flare command 330 is available (and primary flare command 326 is unavailable) to flare command selector module 334 to be utilized as ultimate flare command 318. When adjusted primary pitch rate 352 is greater than or equal to the pitch rate of secondary flare command 330, commanded pitch rate comparator module 332 may generate selected flare command signal 340 indicating that primary flare command 326 is available (and secondary flare command 330 is unavailable) to flare command selector module 334 to be utilized as ultimate flare command 318.

Those skilled in the art will appreciate that in the example embodiment of flare guidance subsystem 300 described above, selected flare command signal 340 generated by commanded pitch rate comparator module 332 and utilized by flare command selector module 334 as an indication of which of primary flare command 326 or secondary flare command 330 to be used as ultimate flare command 318 may change (e.g., transition between primary flare command 326 and secondary flare command 330) as aircraft 200 flies over terrain 124 having different degrees of irregularity throughout flare trajectory 116.

For example, when aircraft 200 is flying over regular or moderately irregular terrain 124 (e.g., along flare trajectory 116), command pitch rate comparator module 332 may generate selected flare command signal 340 indicating selection of primary flare command 326 and flare command selector module 334 may select primary flare command 326 as ultimate flare command 318. Then, when aircraft 200 begins flying over severely irregular terrain 124 (e.g., along flare trajectory 116), command pitch rate comparator module 332 may generate selected flare command signal 340 indicating selection of secondary flare command 330 and flare command selector module 334 may select secondary flare command 330 as ultimate flare command 318. Then, when aircraft 200 again begins flying over regular or moderately irregular terrain 124 (e.g., along flare trajectory 116), command pitch rate comparator module 332 may generate selected flare command signal 340 indicating selection of primary flare command 326 and flare command selector module 334 may select primary flare command 326 as ultimate flare command 318. This process may continue throughout flare trajectory 116.

Flare guidance subsystem 300 may advantageously further be configured to ensure that primary flare command 326 is selected during a final portion of the flare maneuver (e.g., as aircraft approaches touchdown zone 104 along flare trajectory 116) (FIG. 1) such that the desired touchdown location 106 and appropriate sink rate performance are maintained. Accordingly, flare guidance subsystem 300 may further include one or more additional comparator modules configured to compare other flight parameters.

Flare command processor 316 may further include gear altitude comparator module 346. Gear altitude comparator module 346 may include suitable computational logic configured to compare gear altitude 122, for example, from gear altitude module 304, and gear altitude threshold 344. Gear altitude threshold 344 may be a predetermined minimum height of aircraft 200 (e.g., of landing gear 220) above ground surface 126 (FIG. 1). For example, gear altitude threshold 344 may be a suitably low gear altitude of aircraft 200 to ensure that aircraft 200 is over landing zone 102 (e.g., a substantially flat runway). Those skilled in the art will recognize that at very low altitudes along flare trajectory 116, aircraft 200 will be over landing zone 102.

Flare command processor 316 may further include gear altitude threshold module 342 configured to generate gear altitude threshold 344. Appropriate values for gear altitude threshold 344 may be, for example, a function of the distance from landing zone threshold 108 (e.g., runway threshold) to touchdown zone 104, the angle of pre-flare flight path 110 and/or the dimensions of aircraft 200.

When an estimated value of gear altitude 122 is greater than a predetermined value of gear altitude threshold 344, gear altitude comparator module 346 may generate gear altitude signal 356 indicating that aircraft 200 is above gear altitude threshold 344 and, thus, secondary flare command 330 is available (and primary flare command 326 is unavailable) to flare command selector module 334 to be utilized as ultimate flare command 318. When the value of gear altitude threshold 344 is greater than the estimated value of gear altitude 122, gear altitude comparator module 346 may generate gear altitude signal 356 indicating that aircraft 200 is below gear altitude threshold 344 and, thus, primary flare command 326 is available (and secondary flare command 330 is unavailable) to flare command selector module 334 to be utilized as ultimate flare command 318.

Thus, in another embodiment of flare guidance subsystem 300, flare command selector module 334 may include suitable computational logic configured to utilize selected flare command signal 340 and gear altitude signal 356 as the selection criteria. Flare command selector module 334 may utilize secondary flare command 330 as ultimate flare command 318 only when pitch rate command comparator module 332 generates selected flare command signal 340 indicating secondary flare command 330 is available and when gear altitude comparator module 346 generates gear altitude signal 356 indicating aircraft 200 is above gear altitude threshold 344 (e.g., a logic AND gate). Otherwise, flare command selector module 334 may only utilize primary flare command 326 as ultimate flare command 318 (e.g., when at least one of pitch rate command comparator module 332 generates selected flare command signal 340 indicating primary flare command 326 is available or when gear altitude comparator module 346 generates gear altitude signal 356 indicating aircraft 200 is below gear altitude threshold 344).

Flare command processor 316 may further include commanded gear altitude comparator module 354. Commanded gear altitude comparator module 354 may include suitable computational logic configured to compare a value of the gear altitude resulting from a gear altitude command of primary flare command 326 (also referred to herein as “commanded gear altitude”) and commanded gear altitude threshold 350. The gear altitude resulting from the gear altitude command of primary flare command 326 may be a computed gear altitude of aircraft 200 at any point along flare trajectory 116 (FIG. 1) resulting from primary flare control law 324. The commanded gear altitude threshold 350 may be a predetermined minimum height of aircraft 200 (e.g., of landing gear 220) above ground surface 126 at a corresponding point along flare trajectory 116. For example, commanded gear altitude threshold 350 may be a suitably low gear altitude of aircraft 200 to ensure that aircraft 200 is over landing zone 102 (e.g., a substantially flat runway) near the end of flare trajectory 116. Commanded gear altitude threshold 350 may be the same as gear altitude threshold 344 or may be greater (e.g., at a higher altitude) than gear altitude threshold 344.

Flare command processor 316 may further include commanded gear altitude threshold module 348 configured to generate commanded gear altitude threshold 350. Appropriate values for commanded gear altitude threshold 350 may, for example, be a function of the distance from landing zone threshold 108 to touchdown zone 104, the angle of pre-flare flight path 110, the dimensions of aircraft 200, and/or the shape of the commanded flare trajectory computed by the primary flare command processor module 320.

When a computed value of the gear altitude resulting from the gear altitude command of primary flare command 326 is greater than a predetermined value of commanded gear altitude threshold 350, commanded gear altitude comparator module 354 may generate commanded gear altitude signal 358 indicating that aircraft 200 is above commanded gear altitude threshold 350 and, thus, secondary flare command 330 is available (and primary flare command 326 is unavailable) to flare command selector module 334 to be utilized as ultimate flare command 318. When the value of commanded gear altitude threshold 350 is greater than the computed value of the gear altitude resulting from the gear altitude command of primary flare command 326, commanded gear altitude comparator module 354 may generate commanded gear altitude signal 358 indicating that aircraft 200 is below commanded gear altitude threshold 350 and, thus, primary flare command 326 is available (and secondary flare command 330 is unavailable) to flare command selector module 334 to be utilized as ultimate flare command 318.

Such a determination may be advantageous in the event that a wind shear of other disturbance causes aircraft 200 to rise above flare trajectory 116 during the flare maneuver, particularly as aircraft 200 approaches touchdown zone 104. In such a circumstance, aircraft 200 may be over landing zone 102 but still at a higher altitude than gear altitude threshold 344 described above. In this situation, it is desirable to ensure that primary flare control law 324 is used to control the flare maneuver and, thus, primary flare command 326 controls the flare characteristics (e.g., pitch rate).

Thus, in another embodiment of flare guidance subsystem 300, flare command selector module 334 may include suitable computational logic configured to utilize selected flare command signal 340 and commanded gear altitude signal 358 as the selection criteria. Flare command selector module 334 may utilize secondary flare command 330 as ultimate flare command 318 only when pitch rate command comparator module 332 generates selected flare command signal 340 indicating secondary flare command 330 is available and when commanded gear altitude comparator module 354 generates commanded gear altitude signal 358 indicating that aircraft 200 is above commanded gear altitude threshold 350 (e.g., a logic AND gate). Otherwise, flare command selector module 334 may only utilize primary flare command 326 as ultimate flare command 318 (e.g., when at least one of pitch rate command comparator module 332 generates selected flare command signal 340 indicating primary flare command 326 is available or when commanded gear altitude comparator module 354 generates commanded gear altitude signal 358 indicating that aircraft 200 is below commanded gear altitude threshold 350).

In yet another embodiment of flare guidance subsystem 300, flare command selector module 334 may include suitable computational logic configured to utilize selected flare command signal 340, gear altitude signal 356 and commanded gear altitude signal 358 as the selection criteria. Flare command selector module 334 may utilize secondary flare command 330 as ultimate flare command 318 only when pitch rate command comparator module 332 generates selected flare command signal 340 indicating secondary flare command 330 is available, when gear altitude comparator module 346 generates gear altitude signal 356 indicating aircraft 200 is above gear altitude threshold 344 and when commanded gear altitude comparator module 354 generates gear altitude command signal 358 indicating that aircraft 200 is above commanded gear altitude threshold 350 (e.g., a logic AND gate). Otherwise, flare command selector module 334 may only utilize primary flare command 326 as ultimate flare command 318 (e.g., when at least one of pitch rate command comparator module 332 generates selected flare command signal 340 indicating primary flare command 326 is available, when gear altitude comparator module 346 generates gear altitude signal 356 indicating aircraft 200 is below gear altitude threshold 344 or when commanded gear altitude comparator module 354 generates commanded gear altitude signal 358 indicating that aircraft 200 is below commanded gear altitude threshold 350).

In the example embodiments disclosed herein, altitude 112 may be used in place of gear altitude 122, for example, during a flare maneuver performed by an aircraft not having traditional landing gear. In such an implementation of the disclosed systems and methods, substantially the same comparisons, thresholds and selection criteria may be used with altitude 112 instead of gear altitude 122.

Those skilled in the art will appreciate that in any of the example embodiments of flare guidance subsystem 300 described above, ultimate flare command 318 determined (e.g., selected) by flare command selector module 334 may change (e.g., transition between primary flare command 326 and secondary flare command 330) as aircraft 200 flies over terrain 124 having different degrees of irregularity throughout flare trajectory 116.

Those skilled in the art will also appreciate that in any of the example embodiments of flare guidance subsystem 300 described above, ultimate flare command 318 determined by flare command selector module 334 may always be primary flare command 326 when aircraft 200 is proximate touchdown zone 104 (e.g., proximate the end of flare trajectory 116), since aircraft 200 will be at a low altitude (e.g., below gear altitude threshold 344 and/or below commanded gear altitude threshold 350) and will be flying over regular terrain (e.g., a runway).

Those skilled in the art will further appreciate that some of the components illustrated in FIG. 3 may be combined in various ways without the need to include other components described in FIG. 3, other drawing figures, and/or the accompanying disclosure, even though such combination or combinations are not explicitly illustrated herein. Similarly, other components, in addition to and/or in place of the ones illustrated, may be combined with some or all of the components shown and described herein. Some components may be unnecessary in some embodiments.

Thus, the present disclosure is not limited to the particular types or quantity of components illustrated herein. For example, the components illustrated in FIG. 3 may not be independent of one another as shown, but rather may be combined and/or further divided to provide the associated relevant outputs when implemented in different embodiments. For example, flare guidance subsystem 300 may include a single computer processor and computer-readable instructions, that when executed by the processor, utilize various input to provide all or a portion of the outputs illustrated in FIG. 3 and described herein.

Further, the illustrated embodiment of flare guidance subsystem 300 in FIG. 3 is not meant to provide physical or architectural limitations to the manner in which different embodiments may be implemented. Also, some of the components may be presented to illustrate some functional components.

Figure 4:
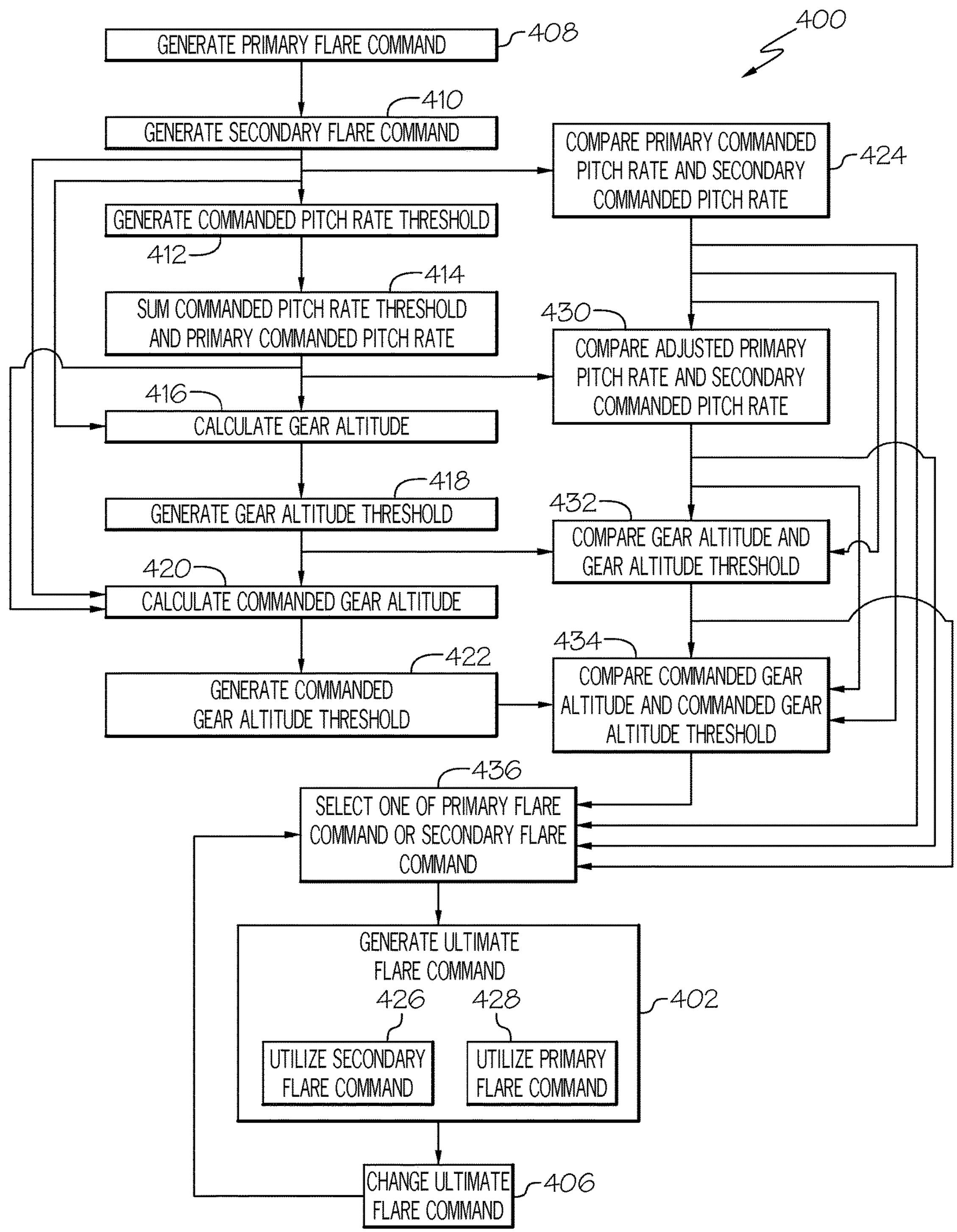
FIG. 4 is a flow diagram of one embodiment of the disclosed method for providing guidance during the flare maneuver illustrated in FIG. 1.

Referring to FIG. 4, one embodiment of method, generally designated 400, for providing guidance during a flare maneuver of an aircraft is disclosed. Those skilled in the art will appreciate that the logical operations of method 400 may be implemented (1) as a sequence of computer implemented steps or program modules running on a computing system and/or (2) as interconnected machine logic circuits or circuit modules within the computing system. The particular implementation of method 400 may be a matter of choice dependent on the performance and other operating parameters of the computing system. Accordingly, the logical operations described herein may be referred to as steps or modules. These steps and modules may be implemented in software, in firmware, in hardware, in special purpose digital logic, and/or any combination thereof. For example, embodiments of method 400 may be performed by embodiments of flare guidance subsystem 300, including by one or all of the modules described above with respect to FIG. 3.

Referring to FIG. 4, and with reference to FIGS. 1-3, method 400 may include the step of generating ultimate flare command 318 from one of primary flare command 326 or secondary flare command 330, as shown at block 402. Ultimate flare command 318 may be generated by flare command processor module 316 of flare guidance subsystem 300. As described above, ultimate flare command 318 may account for variations in terrain 124 between flare engage altitude 114 and landing zone 102.

Method 400 may further include the step of changing ultimate flare command 318 between primary flare command 326 and secondary flare command 330, for example, based on variations in terrain 124 (e.g., transitions between regular and irregular terrain 124), as shown at block 406. Ultimate flare command 318 may be primary flare command 326 when aircraft 200 is flying over regular terrain 124 along flare trajectory 116. Ultimate flare command 318 may be secondary flare command 330 when aircraft 200 is flying over irregular terrain 124 along flare trajectory 116.

Method 400 may further include the step of generating primary flare command 326 from primary flare control law 324 based on altitude 112 (e.g., gear altitude 122) of aircraft 200, as shown at block 408. Altitude 112 may be determined (e.g., sensed) by sensor resources 272 of aircraft 200, for example, by height sensing resource 266. Gear altitude 122 may be calculated by gear altitude module 304 of flare guidance subsystem 300. Primary flare command 326 may include the primary commanded pitch rate of aircraft 200. Primary flare command 326 may be generated by primary flare command processor module 320 of flare guidance subsystem 300 using primary flare control law 324.

Method 400 may further include the step of generating secondary flare command 330 from secondary flare control law 328 based on inertial vertical speed 308 (or other flight parameters) of aircraft 200, as shown at block 410. Inertial vertical speed 308 may be determined (e.g., sensed) by sensor resources 272 of aircraft 200, for example, by inertial vertical speed sensing resource 268. Secondary flare command 330 may include the secondary commanded pitch rate of aircraft 200. Secondary flare command 330 may be generated by secondary flare command processor module 322 of flare guidance subsystem 300 using secondary flare control law 328.

Method 400 may further include the step of generating commanded pitch rate threshold 338, as shown at block 412. Commanded pitch rate threshold 338 may be generated by commanded pitch rate threshold module 336 of flare guidance subsystem 300. Method 400 may further include the step of summing commanded pitch rate threshold 338 and primary commanded pitch rate to arrive at adjusted primary pitch rate 352, as shown at block 414.

Method 400 may further include the step of calculating gear altitude 122 of aircraft 200 from altitude 112, as shown at block 416. Gear altitude 122 may be determined by gear altitude module 304 of flare guidance subsystem 300. Method 400 may further include the step of generating gear altitude threshold 344, as shown at block 418. Gear altitude threshold 344 may be generated by gear altitude threshold module 342.

Method 400 may further include the step of calculating the commanded gear altitude of aircraft 200 along flare trajectory 116 from primary flare command 326, as shown at block 420. The commanded gear altitude may be determined by primary flare command processor module 320 or commanded gear altitude comparator module 354 from primary flare command 326 generated by primary flare control law 324. Method may further include the step of generating commanded gear altitude threshold 350, as shown at block 422. Commanded gear altitude threshold 350 may be generated by commanded gear altitude threshold module 348.

In one implementation, method 400 may further include comparing the primary commanded pitch rate and the secondary commanded pitch rate in order to generate ultimate flare command 318, as shown at block 424. Comparison of the primary commanded pitch rate and the secondary commanded pitch rate may be performed by commanded pitch rate comparator module 332 of flare guidance subsystem 300. Method 400 may further include the step of selecting one of primary flare command 326 or secondary flare command 330, as shown at block 436. When generating ultimate flare command 318 (block 402), secondary flare command 330 may be utilized as ultimate flare command 318 when the secondary commanded pitch rate of secondary flare command 330 is greater than the primary commanded pitch rate of primary flare command 326, as shown at block 426. Alternatively, when generating ultimate flare command 318, primary flare command 326 may be utilized as ultimate flare command 318 when the primary commanded pitch rate of primary flare command 326 is greater than or equal to the secondary commanded pitch rate of secondary flare command 330, as shown at block 428.

In another implementation, method 400 may further include comparing adjusted primary pitch rate 352 and the secondary commanded pitch rate, as shown at block 430. Comparison of adjusted primary pitch rate 352 and the secondary commanded pitch rate may be performed by commanded pitch rate comparator module 332 of flare guidance subsystem 300. Method 400 may further include the step of selecting one of primary flare command 326 or secondary flare command 330, as shown at block 436. When generating ultimate flare command 318 (block 402), secondary flare command 330 may be utilized as ultimate flare command 318 when the secondary commanded pitch rate is greater than adjusted primary pitch rate 352, as shown at block 426. Alternatively, when generating ultimate flare command 318, primary flare command 326 may be utilized as ultimate flare command 318 when adjusted primary pitch rate 352 is greater than or equal to the secondary commanded pitch rate, as shown at block 428.

In another implementation, method 400 may further include comparing gear altitude 122 and gear altitude threshold 344, as shown at block 432. Comparison of gear altitude 122 and gear altitude threshold may be performed by gear altitude comparator module 346 of flare guidance subsystem 300. Method 400 may further include the step of selecting one of primary flare command 326 or secondary flare command 330, as shown at block 436. When generating ultimate flare command 318 (block 402), secondary flare command 330 may be utilized as ultimate flare command 318 when the secondary commanded pitch rate is greater than adjusted primary pitch rate 352 and gear altitude 122 is greater than gear altitude threshold 344, as shown at block 426. Alternatively, when generating ultimate flare command 318, primary flare command 326 may be utilized as ultimate flare command 318 when one of adjusted primary pitch rate 352 is greater than or equal to the secondary commanded pitch rate or gear altitude threshold 344 is greater than gear altitude 122, as shown at block 428.

In another implementation, method 400 may further include comparing the commanded gear altitude and commanded gear altitude threshold 350, as shown at block 434. Comparison of the commanded gear altitude and commanded gear altitude threshold 350 may be performed by commanded gear altitude comparator module 354 of flare guidance subsystem 300. Method 400 may further include the step of selecting one of primary flare command 326 or secondary flare command 330, as shown at block 436. When generating ultimate flare command 318 (block 402), secondary flare command 330 may be utilized as ultimate flare command 318 when the secondary commanded pitch rate is greater than adjusted primary pitch rate 352 and the commanded gear altitude is greater than commanded gear altitude threshold 350, as shown at block 426. Alternatively, when generating ultimate flare command 318, primary flare command 326 may be utilized as ultimate flare command 318 when one of adjusted primary pitch rate 352 is greater than or equal to the secondary commanded pitch rate or commanded gear altitude threshold 350 is greater than the commanded gear altitude, as shown at block 428.

In another implementation of method 400, when generating ultimate flare command 318 (block 402), secondary flare command 330 may be utilized as ultimate flare command 318 when the secondary commanded pitch rate is greater than the primary commanded pitch rate, gear altitude 122 is greater than gear altitude threshold 344 and the commanded gear altitude is greater than commanded gear altitude threshold 350, as shown at block 426. Alternatively, when generating ultimate flare command 318, primary flare command 326 may be utilized as ultimate flare command 318 when one of the primary commanded pitch rate is greater than or equal to the secondary commanded pitch rate, gear altitude threshold 344 is greater than gear altitude 122 or commanded gear altitude threshold 350 is greater than the commanded gear altitude, as shown at block 428.

In another implementation of method 400, when generating ultimate flare command 318 (block 402), secondary flare command 330 may be utilized as ultimate flare command 318 when the secondary commanded pitch rate is greater than adjusted primary pitch rate 352 and gear altitude 122 is greater than gear altitude threshold 344, as shown at block 426. Alternatively, when generating ultimate flare command 318, primary flare command 326 may be utilized as ultimate flare command 318 when one of adjusted primary pitch rate 352 is greater than or equal to the secondary commanded pitch rate or gear altitude threshold 344 is greater than gear altitude 122, as shown at block 428.

In another implementation of method 400, when generating ultimate flare command 318 (block 402), secondary flare command 330 may be utilized as ultimate flare command 318 when the secondary commanded pitch rate is greater than adjusted primary pitch rate 352 and the commanded gear altitude is greater than commanded gear altitude threshold 350, as shown at block 426. Alternatively, when generating ultimate flare command 318, primary flare command 326 may be utilized as ultimate flare command 318 when one of adjusted primary pitch rate 352 is greater than or equal to the secondary commanded pitch rate or commanded gear altitude threshold 350 is greater than the commanded gear altitude, as shown at block 428.

In yet another implementation of method 400, when generating ultimate flare command 318 (block 402), secondary flare command 330 may be utilized as ultimate flare command 318 when the secondary commanded pitch rate is greater than adjusted primary pitch rate 352, gear altitude 122 is greater than gear altitude threshold 344 and the commanded gear altitude is greater than commanded gear altitude threshold 350, as shown at block 426. Alternatively, when generating ultimate flare command 318, primary flare command 326 may be utilized as ultimate flare command 318 when one of adjusted primary pitch rate 352 is greater than or equal to the secondary commanded pitch rate, gear altitude threshold 344 is greater than gear altitude 122 or commanded gear altitude threshold 350 is greater than the commanded gear altitude, as shown at block 428.

While not explicitly illustrated in FIG. 4, method 400 may further include additional steps, for example, prior to generation of ultimate flare command 318 (block 402). Method 400 may include the step of determining pre-flare flight path 110. Pre-flare flight path 110 may be determined, for example, by navigation subsystem 226 and/or path planning subsystem 228 of control system 224, during the approach mode of aircraft 200. Method 400 may further include the step of determining flare engage altitude 114 along pre-flare flight path 110 at which the flare mode of aircraft 200 will be activated. Flare engage altitude 114 may be determined by flare initiation altitude module 302 of flare guidance subsystem 300.

Method 400 may further include the step of activating the flare mode of aircraft 200. The flare mode of aircraft 200 may be activated by flare mode engage module 310 of flare guidance subsystem 300 upon determination by flare mode engage module 310 that aircraft 200 has reached flare engage altitude 114. The flare mode engage module 310 may provide flare mode engagement trigger 312 that transitions aircraft 200 from the approach mode to the flare mode and initiates other components of flare guidance subsystem 300 to perform additional operations to provide guidance during the flare maneuver of aircraft 200, as illustrated in FIG. 4 and described above. For example, method 400 may further include the step of determining flare command path 118 and determining flare trajectory 116, for example at engagement of flare mode. Flare trajectory 116 may provide the desired path of aircraft 200 during the flare maneuver from flare engage altitude 114 to touchdown location 106. The selected ultimate flare command 318 (e.g., either primary flare command 326 or secondary flare command 330) may be utilized to match the actual path of aircraft 200 with flare trajectory 116 during the flare maneuver.

Modifications, additions, or omissions may be made to method 400 without departing from the scope of the present disclosure. Method 400 may include more, fewer, or other steps than those steps illustrated in FIG. 4 and described herein. Additionally, the illustrated steps may be performed in any suitable order. The steps may also be performed in parallel, or in a different order than those described herein.

Figure 5:
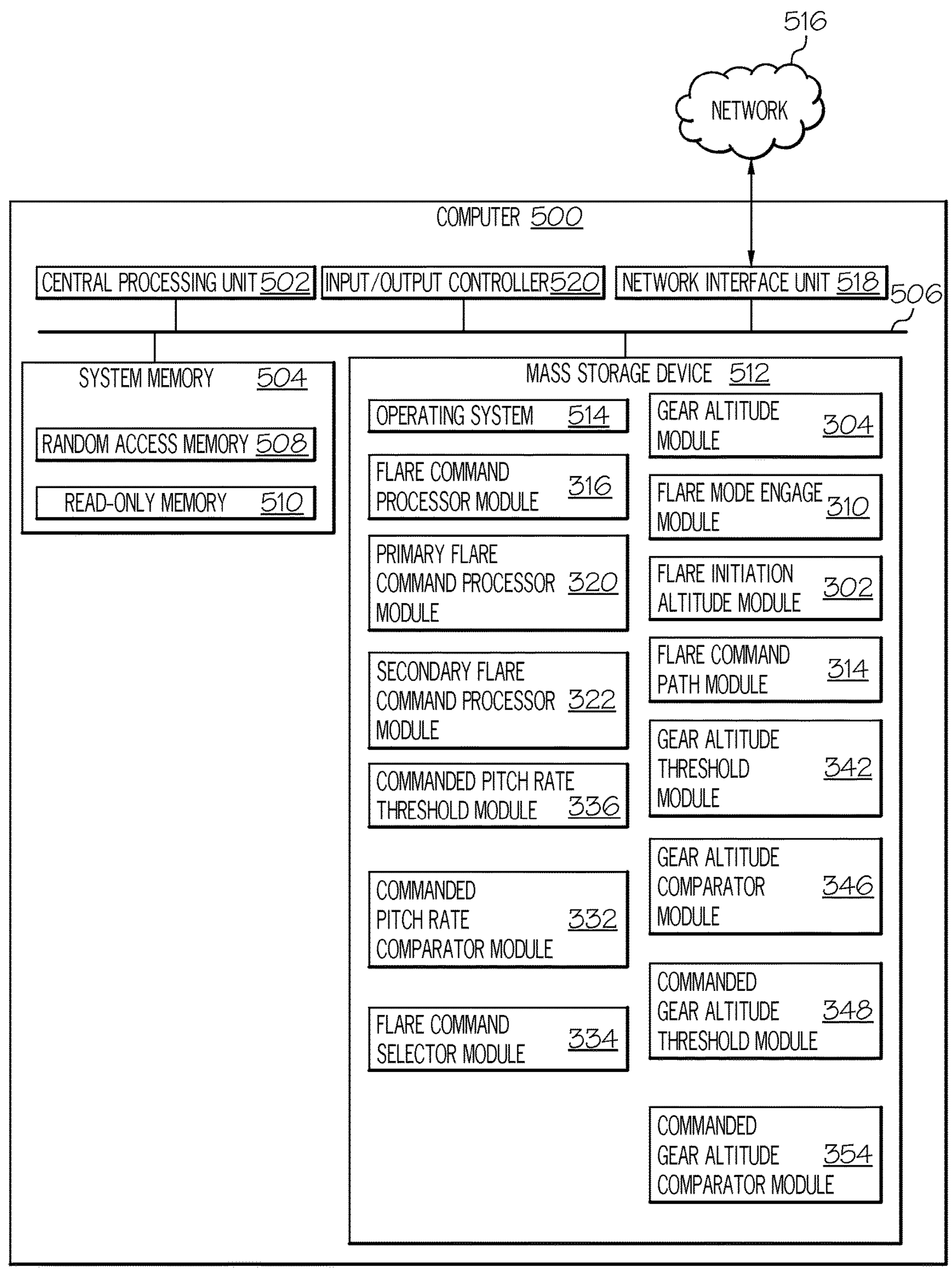
FIG. 5 is a block diagram of one embodiment of a computer for implementing the method of FIG. 4.

Referring to FIG. 5, one embodiment of computer 500 capable of executing the software elements described herein for providing guidance during the flare maneuver of aircraft 200. Computer 500 may be embodied in single computing device or in a combination of one or more processing units, storage units, and/or other computing devices. Computer 500 may include one or more central processing units 502 ("CPUs"), system memory 504 and system bus 506 that couples system memory 504 to CPUs 502. System memory 504 may include random access memory 508 ("RAM") and/or read-only memory 510 ("ROM").

CPUs 502 may be standard programmable processors that perform arithmetic and logical operations necessary for the operation of computer 500. CPUs 502 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

Computer 500 may further include mass storage device 512. Mass storage device 512 may be connected to CPUs 502 through a mass storage controller (not shown) further connected to system bus 506. Mass storage device 512 and its associated computer-readable media provide non-volatile, non-transitory storage for computer 500. Mass storage device 512 may store operating system 514, as well as specific application modules or other program modules, such as gear altitude module 304, flare initiation altitude module 302, flare engage module 310, flare command path module 314, flare command processor module 316, primary flare command processor module 320, secondary flare command processor module 322, commanded pitch rate threshold module 336, commanded pitch rate comparator module 332, gear altitude threshold module 342, gear altitude comparator module 346, commanded gear altitude threshold module 348, commanded gear altitude comparator module 354 and flare command selector module 334 described above in regard to FIG. 3. Mass storage device 512 may also store data collected or utilized by the various systems, subsystems and modules, such as the outputs associated with the components of flare guidance subsystem 300 described above with respect to FIG. 3.

Computer 500 may store programs and data on mass storage device 512 by transforming the physical state of the mass storage device to reflect the information being stored. The specific transformation of physical state may depend on various factors, in different implementations of the embodiments of the systems and methods described herein. Examples of such factors may include, but are not limited to, the technology used to implement mass storage device 512, whether mass storage device 512 is characterized as primary or secondary storage, and the like. For example, computer 500 may store information to mass storage device 512 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete element in a solid-state storage device. Other transformations of physical media are possible without departing from the scope of the present disclosure. Computer 500 may further read information from mass storage device 512 by detecting the physical states or characteristics of one or more particular locations within mass storage device 512.

Although the description of computer-readable media contained herein refers to a mass storage device, such as a hard disk or CD-ROM drive, those skilled in the art will appreciate that computer-readable media can be any available computer media that can be accessed by computer 500. Computer-readable media may include communication media, such as signals, and computer-readable storage media. By way of example, and not limitation, computer-readable storage media may include volatile and non-volatile, removable and non-removable media implemented in any method or technology for the storage of information, such as computer-readable instructions, data structures, program modules, or other data. For example, computer-readable storage media may include, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information in a non-transitory fashion and that can be accessed by computer 500. According to one embodiment, computer 500 may have access to computer-readable storage media storing computer-executable instructions that, when executed by the computer, perform method 400 for providing guidance during the flare maneuver, as described above in regard to FIG. 4.

According to various embodiments, computer 500 may operate in a networked environment using logical connections to remote computers through a network, such as network 516. Computer 500 may connect to network 516 through network interface unit 518 connected to system bus 506. Those skilled in the art will appreciate that network interface unit 518 may also be utilized to connect to other types of networks and/or remote computer systems. Computer 500 may also include input/output controller 520 for providing output to a display device, such as a flight deck display of aircraft 200, computer monitor, a printer, or other type of output device. Input/output controller 520 may further receive input from devices, such as a keyboard, mouse, electronic stylus, touch screen, and the like.

Those skilled in the art will further appreciate that computer 500 may not include all of the elements illustrated in FIG. 5, may include other elements that are not explicitly illustrated in FIG. 5, or may utilize an architecture completely different than that illustrated in FIG. 5.

Thus, embodiments of the systems and methods described herein may advantageously provide for guidance during the landing operation of aircraft 200 and, more particularly, provide for guidance during the flare maneuver of the landing operation when aircraft 200 is flying over irregular terrain 124. Primary flare control law 324 may generate primary flare command 326 suitable to guide aircraft 200 along at least a portion of flare trajectory 116 when aircraft 200 is flying over regular terrain 124 and/or when aircraft 200 is at very low altitudes above landing zone 102. Secondary flare control law 328 may generate secondary flare command 330 suitable to guide aircraft 200 along at least a portion of flare trajectory 116 when aircraft 200 is flying over irregular terrain 124 and, thereby, ignoring severe variations in terrain height on the flare maneuver.

Further, embodiments of the systems and methods described herein may advantageously provide for guidance during the landing operation of aircraft 200 and, more particularly, provide for guidance during the flare maneuver of the landing operation if a sensed gear altitude 122 (e.g., sensed radio altitude) becomes invalid after the start of the flare maneuver. Secondary flare control law 328 may generate secondary flare command 330 suitable to guide aircraft 200 along flare trajectory 116 in the event of a failure of sensor resources 272 (e.g., height sensing resource 266).

Although various embodiments of the disclosed systems and methods have been shown and described, modifications may occur to those skilled in the art upon reading the specification. The present application includes such modifications and is limited only by the scope of the claims.

What is claimed is:

1. A method for providing guidance during a flare maneuver of an aircraft throughout a flare trajectory from a flare engage altitude to a touchdown zone, said method comprising:

utilizing a primary flare command from a primary flare control law based on an altitude of said aircraft that is affected by irregularities in terrain prior to a landing zone threshold, said primary flare command comprises a primary commanded pitch rate of said aircraft resulting from said primary flare command;

utilizing a secondary flare command from a secondary flare control law based on only inertial vertical speed of said aircraft that is unaffected by said irregularities in terrain prior to said landing zone threshold, said secondary flare command comprises a secondary commanded pitch rate of said aircraft resulting from said secondary flare command;

initially comparing said primary commanded pitch rate and said secondary commanded pitch rate at said flare engage altitude;

selecting, at said flare engage altitude, one of:

said primary flare command, when said primary commanded pitch rate is greater than or equal to said secondary commanded pitch rate, and said secondary flare command, when said secondary commanded pitch rate is greater than said primary commanded pitch rate;

continuously comparing said primary commanded pitch rate and said secondary commanded pitch rate throughout said flare trajectory; and guiding said aircraft along said flare trajectory, from said flare engage altitude to said landing zone threshold, by:

switching selection from said primary flare command to said secondary flare command when said secondary commanded pitch rate becomes greater than said primary commanded pitch rate; and switching selection from said secondary flare command to said primary flare command when said primary commanded pitch rate becomes greater than or equal to said secondary commanded pitch rate.

2. The method of claim 1 further comprising guiding said aircraft along said flare trajectory, from said landing zone threshold to said touchdown zone, by selecting said primary flare command.

3. The method of claim 1 further comprising:

utilizing a commanded pitch rate threshold, wherein said commanded pitch rate threshold comprises a predetermined value suitable to weight selection of said primary flare command;

summing said commanded pitch rate threshold and said primary commanded pitch rate to arrive at an adjusted primary commanded pitch rate;

continuously comparing said adjusted primary commanded pitch rate and said secondary commanded pitch rate throughout said flare trajectory; and further guiding said aircraft along said flare trajectory, from said flare engage altitude to said touchdown zone, by:

switching selection from said primary flare command to said secondary flare command when said secondary commanded pitch rate becomes greater than said adjusted primary commanded pitch rate; and switching selection from said secondary flare command to said primary flare command when said adjusted primary commanded pitch rate becomes greater than or equal to said secondary commanded pitch rate.

4. The method of claim 3 further comprising:

calculating a gear altitude of said aircraft from said altitude;

utilizing a gear altitude threshold, wherein said gear altitude threshold comprises a predetermined minimum height above a landing zone suitable to weight selection of said primary flare command; and continuously comparing said gear altitude and said gear altitude threshold throughout said flare trajectory; and further guiding said aircraft along said flare trajectory, from said flare engage altitude to said touchdown zone, by:

switching selection from said primary flare command to said secondary flare command when said secondary commanded pitch rate becomes greater than said adjusted primary commanded pitch rate and said gear altitude becomes greater than said gear altitude threshold; and switching selection from said secondary flare command to said primary flare command when one of said adjusted primary commanded pitch rate becomes greater than or equal to said secondary commanded pitch rate or said gear altitude threshold becomes greater than said gear altitude.

5. The method of claim 3 further comprising:

calculating a commanded gear altitude of said aircraft along said flare trajectory resulting from said primary flare command;

utilizing a commanded gear altitude threshold, wherein said commanded gear altitude threshold comprises a predetermined minimum height above a landing zone along said flare trajectory suitable to weight selection of said primary flare command; and continuously comparing said commanded gear altitude and said commanded gear altitude threshold throughout said flare trajectory; and further guiding said aircraft along said flare trajectory, from said flare engage altitude to said touchdown zone, by:

switching selection from said primary flare command to said secondary flare command when said secondary commanded pitch rate becomes greater than said adjusted primary commanded pitch rate and said commanded gear altitude becomes greater than said commanded gear altitude threshold; and switching selection from said secondary flare command to said primary flare command when one of said adjusted primary commanded pitch rate becomes greater than or equal to said secondary commanded pitch rate or said commanded gear altitude threshold becomes greater than said commanded gear altitude.

6. The method of claim 3 further comprising:

calculating a gear altitude of said aircraft from said altitude;

utilizing a gear altitude threshold, wherein said gear altitude threshold comprises a predetermined minimum height above a landing zone suitable to weight selection of said primary flare command;

calculating a commanded gear altitude of said aircraft along said flare trajectory resulting from said primary flare command;

utilizing a commanded gear altitude threshold, wherein said commanded gear altitude threshold comprises a predetermined minimum height above a landing zone along said flare trajectory suitable to weight selection of said primary flare command;

continuously comparing said gear altitude and said gear altitude threshold throughout said flare trajectory; and continuously comparing said commanded gear altitude and said commanded gear altitude threshold throughout said flare trajectory; and further guiding said aircraft along said flare trajectory, from said flare engage altitude to said touchdown zone, by:

switching selection from said primary flare command to said secondary flare command when said secondary commanded pitch rate becomes greater than said adjusted primary commanded pitch rate, said gear altitude becomes greater than said gear altitude threshold and said commanded gear altitude becomes greater than said commanded gear altitude threshold; and switching selection from said secondary flare command to said primary flare command when one of said adjusted primary commanded pitch rate becomes greater than or equal to said secondary commanded pitch rate, said gear altitude threshold becomes greater than said gear altitude or said commanded gear altitude threshold becomes greater than said commanded gear altitude.

7. The method of claim 1 further comprising:

calculating a gear altitude of said aircraft from said altitude;

utilizing a gear altitude threshold, wherein said gear altitude threshold comprises a predetermined minimum height above a landing zone suitable to weight selection of said primary flare command;

continuously comparing said gear altitude and said gear altitude threshold throughout said flare trajectory; and further guiding said aircraft along said flare trajectory, from said flare engage altitude to said touchdown zone, by:

switching selection from said primary flare command to said secondary flare command when said secondary commanded pitch rate becomes greater than said primary commanded pitch rate and said gear altitude becomes greater than said gear altitude threshold; and switching selection from said secondary flare command to said primary flare command when one of said primary commanded pitch rate becomes greater than or equal to said secondary commanded pitch rate or said gear altitude threshold becomes greater than said gear altitude.

8. The method of claim 1 further comprising:

calculating a commanded gear altitude of said aircraft along said flare trajectory resulting from said primary flare command;

utilizing a commanded gear altitude threshold, wherein said commanded gear altitude threshold comprises a predetermined minimum height above a landing zone along said flare trajectory suitable to weight selection of said primary flare command; and continuously comparing said commanded gear altitude and said commanded gear altitude threshold throughout said flare trajectory; and further guiding said aircraft along said flare trajectory, from said flare engage altitude to said touchdown zone, by:

switching selection from said primary flare command to said secondary flare command when said secondary commanded pitch rate becomes greater than said primary commanded pitch rate and said commanded gear altitude becomes greater than said commanded gear altitude threshold; and switching selection from said secondary flare command to said primary flare command when one of said primary commanded pitch rate becomes greater than or equal to said secondary commanded pitch rate or said commanded gear altitude threshold becomes greater than said commanded gear altitude.

9. The method of claim 1 further comprising:

calculating a gear altitude of said aircraft from said altitude;

utilizing a gear altitude threshold, wherein said gear altitude threshold comprises a predetermined minimum height above a landing zone suitable to weight selection of said primary flare command;

calculating a commanded gear altitude of said aircraft along said flare trajectory resulting from said primary flare command;

utilizing a commanded gear altitude threshold, wherein said commanded gear altitude threshold comprises a predetermined minimum height above a landing zone along said flare trajectory suitable to weight selection of said primary flare command;

continuously comparing said gear altitude and said gear altitude threshold throughout said flare trajectory;

continuously comparing said commanded gear altitude and said commanded gear altitude threshold throughout said flare trajectory; and further guiding said aircraft along said flare trajectory, from said flare engage altitude to said touchdown zone, by:

switching selection from said primary flare command to said secondary flare command when said secondary commanded pitch rate becomes greater than said primary commanded pitch rate, said gear altitude becomes greater than said gear altitude threshold and said commanded gear altitude becomes greater than said commanded gear altitude threshold; and switching selection from said secondary flare command to said primary flare command when one of said primary commanded pitch rate becomes greater than or equal to said secondary commanded pitch rate, said gear altitude threshold becomes greater than said gear altitude or said commanded gear altitude threshold becomes greater than said commanded gear altitude.

10. A non-transitory computer-readable storage medium comprising computer-executable instructions that, when executed by a flare guidance control system of an aircraft, causes said flare guidance control system to:

utilize a primary flare command from a primary flare control law based on an altitude of said aircraft that is affected by irregularities in terrain prior to a landing zone threshold, said primary flare command comprises a primary commanded pitch rate of said aircraft resulting from said primary flare command;

utilize a secondary flare command from a secondary flare control law based on only inertial vertical speed of said aircraft that is unaffected by said irregularities in terrain prior to said landing zone threshold, said secondary flare command comprises a secondary commanded pitch rate of said aircraft resulting from said secondary flare command;

initially compare said primary commanded pitch rate and said secondary commanded pitch rate at a flare engage altitude of said aircraft;

select, at said flare engage altitude, one of:

said primary flare command, when said primary commanded pitch rate is greater than or equal to said secondary commanded pitch rate, and said secondary flare command, when said secondary commanded pitch rate is greater than said primary commanded pitch rate;

continuously compare said primary commanded pitch rate and said secondary commanded pitch rate throughout a flare trajectory of said aircraft; and guide said aircraft along said flare trajectory, from said flare engage altitude to a landing zone threshold, by:

switching selection from said primary flare command to said secondary flare command when said secondary commanded pitch rate becomes greater than said primary commanded pitch rate; and switching selection from said secondary flare command to said primary flare command when said primary commanded pitch rate becomes greater than or equal to said secondary commanded pitch rate.

11. The computer-readable storage medium of claim 10 comprising further computer-executable instructions that, when executed by said flare guidance control system of said aircraft, causes said flare guidance control system to:

utilize a commanded pitch rate threshold, wherein said commanded pitch rate threshold comprises a predetermined value suitable to weight selection of said primary flare command;

sum said commanded pitch rate threshold and said primary commanded pitch rate to arrive at an adjusted primary commanded pitch rate;

continuously compare said adjusted primary commanded pitch rate and said secondary commanded pitch rate throughout said flare trajectory; and further guide said aircraft along said flare trajectory, from said flare engage altitude to a touchdown zone, by:

switching selection from said primary flare command to said secondary flare command when said secondary commanded pitch rate becomes greater than said adjusted primary commanded pitch rate; and switching selection from said secondary flare command to said primary flare command when said adjusted primary commanded pitch rate becomes greater than or equal to said secondary commanded pitch rate.

12. The computer-readable storage medium of claim 11 comprising further computer-executable instructions that, when executed by said flare guidance control system of said aircraft, causes said flare guidance control system to:

calculate a gear altitude of said aircraft from said altitude;

utilize a gear altitude threshold, wherein said gear altitude threshold comprises a predetermined minimum height above a landing zone suitable to weight selection of said primary flare command;

continuously compare said gear altitude and said gear altitude threshold throughout said flare trajectory; and further guide said aircraft along said flare trajectory, from said flare engage altitude to said touchdown zone, by:

switching selection from said primary flare command to said secondary flare command when said secondary commanded pitch rate becomes greater than said adjusted primary commanded pitch rate and said gear altitude becomes greater than said gear altitude threshold; and switching selection from said secondary flare command to said primary flare command when one of said adjusted primary commanded pitch rate becomes greater than or equal to said secondary commanded pitch rate or said gear altitude threshold becomes greater than said gear altitude.

13. The computer-readable storage medium of claim 11 comprising further computer-executable instructions that, when executed by said flare guidance control system of said aircraft, causes said flare guidance control system to:

calculate a commanded gear altitude of said aircraft along said flare trajectory resulting from said primary flare command;

utilize a commanded gear altitude threshold, wherein said commanded gear altitude threshold comprises a predetermined minimum height above a landing zone along said flare trajectory suitable to weight selection of said primary flare command;

continuously compare said commanded gear altitude and said commanded gear altitude threshold throughout said flare trajectory; and further guide said aircraft along said flare trajectory, from said flare engage altitude to said touchdown zone, by:

switching selection from said primary flare command to said secondary flare command when said secondary commanded pitch rate becomes greater than said adjusted primary commanded pitch rate and said commanded gear altitude becomes greater than said commanded gear altitude threshold; and switching selection from said secondary flare command to said primary flare command when one of said adjusted primary commanded pitch rate becomes greater than or equal to said secondary commanded pitch rate or said commanded gear altitude threshold becomes greater than said commanded gear altitude.

14. The computer-readable storage medium of claim 10 comprising further computer-executable instructions that, when executed by said flare guidance control system of said aircraft, causes said flare guidance control system to:

calculate a gear altitude of said aircraft from said altitude;

utilize a gear altitude threshold, wherein said gear altitude threshold comprises a predetermined minimum height above a landing zone suitable to weight selection of said primary flare command;

continuously compare said gear altitude and said gear altitude threshold throughout said flare trajectory; and further guide said aircraft along said flare trajectory, from said flare engage altitude to a touchdown zone, by:

switching selection from said primary flare command to said secondary flare command when said secondary commanded pitch rate becomes greater than said primary commanded pitch rate and said gear altitude becomes greater than said gear altitude threshold; and switching selection from said secondary flare command to said primary flare command when one of said primary commanded pitch rate becomes greater than or equal to said secondary commanded pitch rate or said gear altitude threshold becomes greater than said gear altitude.

15. The computer-readable storage medium of claim 10 comprising further computer-executable instructions that, when executed by said flare guidance control system of said aircraft, cause said flare guidance control system to:

calculate a commanded gear altitude of said aircraft along said flare trajectory resulting from said primary flare command;

utilize a commanded gear altitude threshold, wherein said commanded gear altitude threshold comprises a predetermined minimum height above a landing zone along said flare trajectory suitable to weight selection of said primary flare command;

continuously compare said commanded gear altitude and said commanded gear altitude threshold throughout said flare trajectory; and further guide said aircraft along said flare trajectory, from said flare engage altitude to a touchdown zone, by:

switching selection from said primary flare command to said secondary flare command when said secondary commanded pitch rate becomes greater than said primary commanded pitch rate and said commanded gear altitude becomes greater than said commanded gear altitude threshold; and switching selection from said secondary flare command to said primary flare command when one of said primary commanded pitch rate becomes greater than or equal to said secondary commanded pitch rate or said commanded gear altitude threshold becomes greater than said commanded gear altitude.

16. The computer-readable storage medium of claim 10 comprising further computer-executable instructions that, when executed by said flare guidance control system of said aircraft, cause said flare guidance control system to:

calculate a gear altitude of said aircraft from said altitude;

utilize a gear altitude threshold, wherein said gear altitude threshold comprises a predetermined minimum height above a landing zone suitable to weight selection of said primary flare command;

calculate a commanded gear altitude of said aircraft along said flare trajectory resulting from said primary flare command;

utilize a commanded gear altitude threshold, wherein said commanded gear altitude threshold comprises a predetermined minimum height above a landing zone along said flare trajectory suitable to weight selection of said primary flare command;

continuously compare said gear altitude and said gear altitude threshold throughout said flare trajectory;

continuously compare said commanded gear altitude and said commanded gear altitude threshold throughout said flare trajectory; and further guide said aircraft along said flare trajectory, from said flare engage altitude to a touchdown zone, by:

switching selection from said primary flare command to said secondary flare command when said secondary commanded pitch rate becomes greater than said primary commanded pitch rate, said gear altitude becomes greater than said gear altitude threshold and said commanded gear altitude becomes greater than said commanded gear altitude threshold; and switching selection from said secondary flare command to said primary flare command when one of said primary commanded pitch rate becomes greater than or equal to said secondary commanded pitch rate, said gear altitude threshold becomes greater than said gear altitude or said commanded gear altitude threshold becomes greater than said commanded gear altitude.

17. A system for providing guidance during a flare maneuver of an aircraft throughout a flare trajectory from a flare engage altitude to a touchdown zone, said system comprising:

a processor; and a non-transitory computer-readable storage medium comprising computer-executable instructions that, when executed by said processor, causes said processor to:

utilize a primary flare command from a primary flare control law based on an altitude of said aircraft that is affected by irregularities in terrain prior to a landing zone threshold, said primary flare command comprises a primary commanded pitch rate of said aircraft resulting from said primary flare command;

utilize a secondary flare command from a secondary flare control law based on only inertial vertical speed of said aircraft that is unaffected by said irregularities in terrain prior to said landing zone threshold, said secondary flare command comprises a secondary commanded pitch rate of said aircraft resulting from said secondary flare command;

initially compare said primary commanded pitch rate and said secondary commanded pitch rate at said flare engage altitude of said aircraft;

select, at said flare engage altitude, one of:

said primary flare command, when said primary commanded pitch rate is greater than or equal to said secondary commanded pitch rate, and said secondary flare command, when said secondary commanded pitch rate is greater than said primary commanded pitch rate;

continuously compare said primary commanded pitch rate and said secondary commanded pitch rate throughout said flare trajectory; and guide said aircraft along said flare trajectory, from said flare engage altitude to a landing zone threshold, by:

switching selection from said primary flare command to said secondary flare command when said secondary commanded pitch rate becomes greater than said primary commanded pitch rate; and switching selection from said secondary flare command to said primary flare command when said primary commanded pitch rate becomes greater than or equal to said secondary commanded pitch rate.

18. The system of claim 17, said computer-executable instructions further causes said processor to:

utilize a commanded pitch rate threshold, wherein said commanded pitch rate threshold comprises a predetermined value suitable to weight selection of said primary flare command;

sum said commanded pitch rate threshold and said primary commanded pitch rate to arrive at an adjusted primary commanded pitch rate;

continuously compare said adjusted primary commanded pitch rate and said secondary commanded pitch rate throughout said flare trajectory; and further guide said aircraft along said flare trajectory, from said flare engage altitude to said touchdown zone, by:

switching selection from said primary flare command to said secondary flare command when said secondary commanded pitch rate becomes greater than said adjusted primary commanded pitch rate; and switching selection from said secondary flare command to said primary flare command when said adjusted primary commanded pitch rate becomes greater than or equal to said secondary commanded pitch rate.

19. The system of claim 18, wherein said computer-executable instructions further causes said processor to:

calculate a gear altitude of said aircraft from said altitude;

utilize a gear altitude threshold, wherein said gear altitude threshold comprises a predetermined minimum height above a landing zone suitable to weight selection of said primary flare command;

calculate a commanded gear altitude of said aircraft along said flare trajectory resulting from said primary flare command;

utilize a commanded gear altitude threshold, wherein said commanded gear altitude threshold comprises a predetermined minimum height above a landing zone along said flare trajectory suitable to weight selection of said primary flare command;

continuously compare said gear altitude and said gear altitude threshold throughout said flare trajectory;

continuously compare said commanded gear altitude and said commanded gear altitude threshold throughout said flare trajectory; and further guide said aircraft along said flare trajectory, from said flare engage altitude to said touchdown zone, by:

switching selection from said primary flare command to said secondary flare command when said secondary commanded pitch rate becomes greater than said adjusted primary commanded pitch rate, said gear altitude becomes greater than said gear altitude threshold and said commanded gear altitude becomes greater than said commanded gear altitude threshold; and switching selection from said secondary flare command to said primary flare command when one of said adjusted primary commanded pitch rate becomes greater than or equal to said secondary commanded pitch rate, said gear altitude threshold becomes greater than said gear altitude or said commanded gear altitude threshold becomes greater than said commanded gear altitude.

20. The system of claim 17, wherein said computer-executable instructions further causes said processor to:

calculate a gear altitude of said aircraft from said altitude;

utilize a gear altitude threshold, wherein said gear altitude threshold comprises a predetermined minimum height above a landing zone suitable to weight selection of said primary flare command;

calculate a commanded gear altitude of said aircraft along said flare trajectory resulting from said primary flare command;

utilize a commanded gear altitude threshold, wherein said commanded gear altitude threshold comprises a predetermined minimum height above a landing zone along said flare trajectory suitable to weight selection of said primary flare command;

continuously compare said gear altitude and said gear altitude threshold throughout said flare trajectory;

continuously compare said commanded gear altitude and said commanded gear altitude threshold throughout said flare trajectory; and further guide said aircraft along said flare trajectory, from said flare engage altitude to said touchdown zone, by:

switching selection from said primary flare command to said secondary flare command when said secondary commanded pitch rate becomes greater than said primary commanded pitch rate, said gear altitude becomes greater than said gear altitude threshold and said commanded gear altitude becomes greater than said commanded gear altitude threshold; and switching selection from said secondary flare command to said primary flare command when one of said primary commanded pitch rate becomes greater than or equal to said secondary commanded pitch rate, said gear altitude threshold becomes greater than said gear altitude or said commanded gear altitude threshold becomes greater than said commanded gear altitude.

* * * * *